(12) United States Patent
Fukaya

(10) Patent No.: US 9,923,605 B2
(45) Date of Patent: Mar. 20, 2018

(54) ELECTRONIC APPARATUS

(71) Applicant: CANON KABUSHIKI KAISHA, Tokyo (JP)

(72) Inventor: Yudai Fukaya, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 266 days.

(21) Appl. No.: 14/856,498

(22) Filed: Sep. 16, 2015

(65) Prior Publication Data

US 2016/0087689 A1 Mar. 24, 2016

(30) Foreign Application Priority Data

Sep. 22, 2014 (JP) ................................ 2014-193069

(51) Int. Cl.

| H01F 38/14 | (2006.01) |
|---|---|
| H01F 37/00 | (2006.01) |
| H02J 17/00 | (2006.01) |
| H04B 5/00 | (2006.01) |
| H02J 7/02 | (2016.01) |
| H02J 5/00 | (2016.01) |
| H02J 50/10 | (2016.01) |
| H02J 50/80 | (2016.01) |

(52) U.S. Cl.
CPC ............ *H04B 5/0037* (2013.01); *H02J 5/005* (2013.01); *H02J 7/025* (2013.01); *H02J 50/10* (2016.02); *H02J 50/80* (2016.02); *H04B 5/0031* (2013.01)

(58) Field of Classification Search
CPC . H02J 5/005; H02J 7/025; H02J 17/00; H04B 5/0025–5/0093; B60L 11/182; B60L 11/1829–11/1831; Y02T 90/122; H01F 38/14; H01F 2038/143–2038/146; A61B 1/00029; A61N 1/3787

USPC .......................................... 307/104; 320/108
See application file for complete search history.

(56) References Cited

U.S. PATENT DOCUMENTS

| 8,983,374 B2 | 3/2015 | Wiley |
|---|---|---|
| 2010/0041418 A1 | 2/2010 | Edge et al. |
| 2012/0149301 A1 | 6/2012 | Wiley |
| 2013/0033235 A1 | 2/2013 | Fukaya |
| 2014/0375257 A1 | 12/2014 | Akiyama et al. |
| 2015/0130292 A1 | 5/2015 | Yeon et al. |
| 2015/0239354 A1 | 8/2015 | Gorai et al. |

(Continued)

FOREIGN PATENT DOCUMENTS

| JP | 2013-038854 A | 2/2013 |
|---|---|---|
| JP | 2014-504495 A | 2/2014 |
| WO | 2012/082570 A1 | 6/2012 |

OTHER PUBLICATIONS

U.S. Appl. No. 14/855,817 filed by Yudai Fukaya on Sep. 16, 2015.

*Primary Examiner* — Hal Kaplan
(74) *Attorney, Agent, or Firm* — Fitzpatrick, Cella, Harper & Scinto

(57) ABSTRACT

An electronic apparatus includes an antenna that wirelessly receives power; a power circuit that inputs power received by the antenna; a communication circuit that performs communication using the antenna; switches; and a resonant element that resonates with the antenna, wherein the resonant element is arranged between the antenna and one of the power circuit and the communication circuit, and wherein at least one of the switches is arranged between the resonant element and the one circuit, and at least one switch different from the switch is arranged between the other circuit and the antenna.

17 Claims, 15 Drawing Sheets

(56) References Cited

U.S. PATENT DOCUMENTS

2015/0366014 A1  12/2015  Itoh et al.
2016/0141882 A1   5/2016  Ichikawa
2017/0025903 A1   1/2017  Song et al.

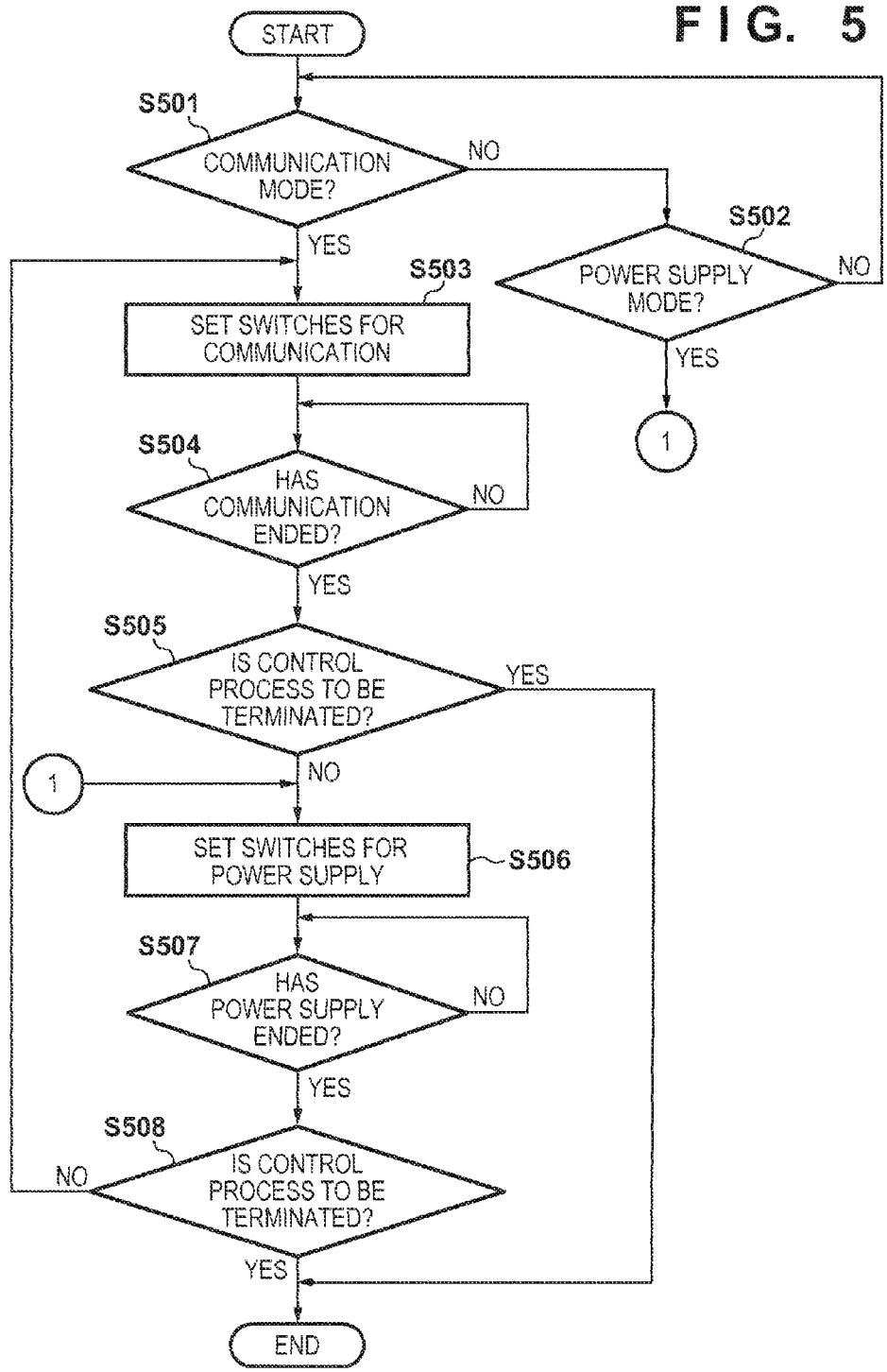

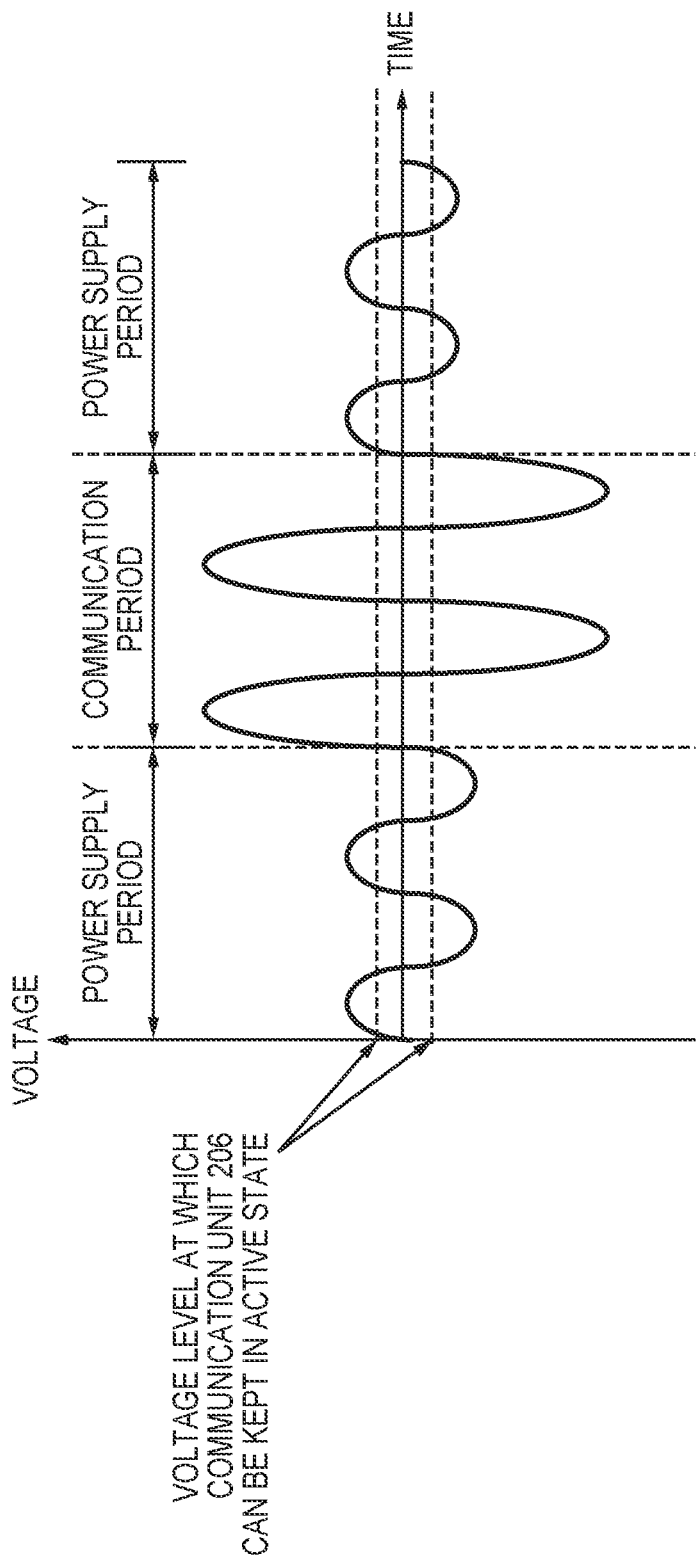

ELECTRONIC APPARATUS

BACKGROUND

Field of the Invention

The present invention relates to an electronic apparatus for receiving power wirelessly.

Description of the Related Art

In recent years, there is known a wireless power supply system which includes a power supply apparatus having, as an antenna, a primary coil for outputting power wirelessly without performing physical connection by a connector, and an electronic apparatus having, as an antenna, a secondary coil for receiving power supplied from the power supply apparatus wirelessly. It is known that the power supply apparatus and the electronic apparatus communicate with each other to control power supply in the wireless power supply system.

In the electronic apparatus of such wireless power supply system, it is known to switch the connection destination of the antenna of the electronic apparatus between a communication circuit and a power receiving circuit to prevent excess power from being supplied from the power supply apparatus to the communication circuit when supplying power (Japanese Patent Laid-Open No. 2014-504495).

This technique, however, does not consider a decrease in power supply efficiency and a decrease in communication sensitivity which are caused when the connection destination of the antenna of the electronic apparatus is switched between the communication circuit and the power receiving circuit. Consequently, even if the antenna of the electronic apparatus and the communication circuit are connected to each other, communication using the communication circuit is not appropriately performed in some cases. Furthermore, even if the antenna of the electronic apparatus and the power receiving circuit are connected to each other, receiving power from the power supply apparatus using the power receiving circuit is not appropriately performed in some cases.

SUMMARY

According to an aspect of the present invention, an apparatus and method capable of appropriately controlling communication with a power supply apparatus and power reception from the power supply apparatus are provided.

According to an aspect of the present invention, there is provided an electronic apparatus comprising: an antenna that wirelessly receives power; antenna; a communication circuit that performs communication using the antenna; and switches; and a resonant element that resonates with the antenna, wherein the resonant element is arranged between the antenna and one of the power circuit and the communication circuit, and wherein at least one of the switches is arranged between the resonant element and the one circuit, and at least one switch different from the switch is arranged between the other circuit and the antenna.

According to an aspect of the present invention, there is provided an electronic apparatus comprising: an antenna that wirelessly receives power; a power circuit that inputs power received by the antenna; a communication circuit that performs communication using the antenna; a switch that switches between a conductive state and a non-conductive state; and a resonance circuit that resonates with the antenna, wherein the switch switches to input power received by the antenna to the power circuit at the time of power supply, and to input power received by the antenna to the communication circuit at the time of communication, and wherein an arrangement of the resonance circuit is changed by switching the switch.

According to an aspect of the present invention, there is provided an electronic apparatus comprising: an antenna that wirelessly receives power; a power circuit that inputs power received by the antenna; a communication circuit that performs communication using the antenna; and switches, wherein the switches operate to input power received by the antenna to the power circuit at the time of power supply, and to input power received by the antenna to the communication circuit at the time of communication, and wherein one of terminals of each of the switches is connected to GND.

Further features and aspects of the present invention will become apparent from the following description of exemplary embodiments.

BRIEF DESCRIPTION OF THE DRAWINGS

The drawings, which are incorporated in and constitute a part of the specification, illustrate exemplary embodiments, features, and aspects of the present invention.

FIG. 5 is a flowchart for illustrating an example of a control process in the first and second embodiments;

FIG. 13 is an illustration showing a voltage waveform of an input terminal of the communication unit 206 in the first and second embodiments.

DESCRIPTION OF THE EMBODIMENTS

Exemplary embodiments, features, and aspects of the present invention will be described below with reference to the drawings.

(First Embodiment)
(Description of System Configuration)

Figure 1:
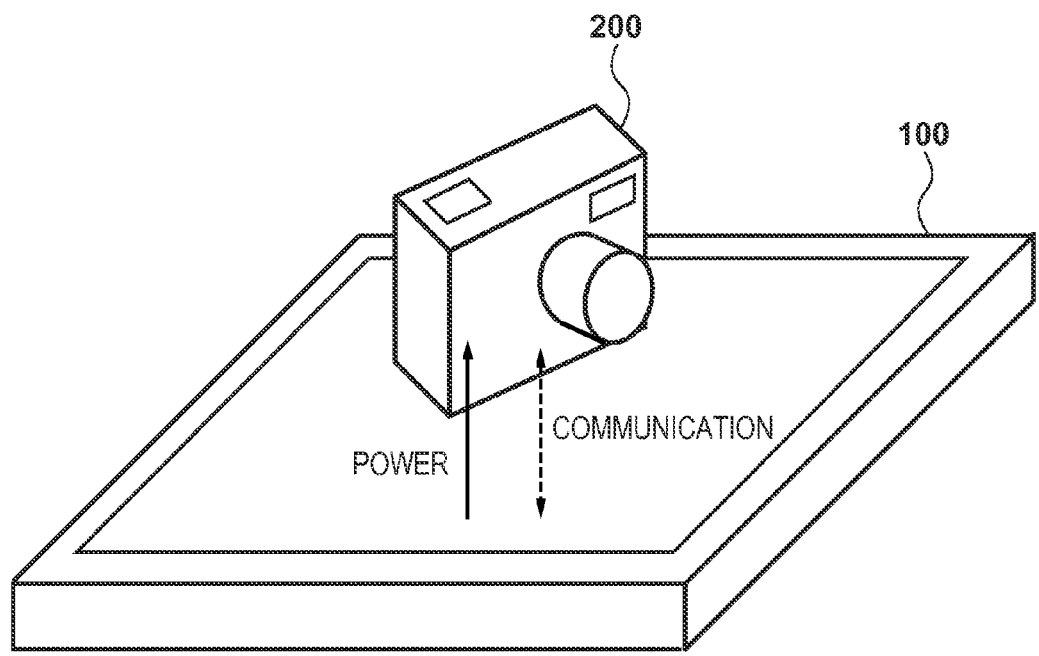
FIG. 1 a diagram for illustrating an example of a configuration of a wireless power supply system in first and second embodiments.

The first embodiment will be described below with reference to the accompanying drawings. As shown in FIG. 1, a wireless power supply system in the first and second embodiments includes an electronic apparatus 200 and a power supply apparatus 100 for wirelessly supplying power to the electronic apparatus 200. The power supply apparatus 100 can wirelessly communicate with the electronic apparatus 200 to control power supply to the electronic apparatus.

In a case where the distance between the power supply apparatus 100 and the electronic apparatus 200 falls within a predetermined range, the power supply apparatus 100 having a power supply antenna 101 performs wireless communication via the power supply antenna 101, and determines whether the electronic apparatus 200 is an apparatus capable of receiving power. If the power supply apparatus 100 determines that the electronic apparatus 200 is an apparatus capable of receiving power, it outputs power for power supply via the power supply antenna 101 to supply the power to the electronic apparatus 200.

The electronic apparatus 200 having a power receiving antenna 201 wirelessly accepts, via the power receiving antenna 201, the power output from the power supply apparatus 100.

If the distance between the power supply apparatus 100 and the electronic apparatus 200 falls outside the predetermined range, the power supply apparatus 100 outputs small power at regular intervals to detect whether the electronic apparatus 200 falls within the predetermined range.

Note that the predetermined range is a range where the electronic apparatus 200 can perform communication with power for communication supplied from the power supply apparatus 100.

If the electronic apparatus 200 is an electronic apparatus which operates with power supplied from a secondary battery 404, it may be an image capture apparatus such as a digital still camera or digital video camera, or a playback apparatus such as a player for playing back audio data and image data. Alternatively, the electronic apparatus 200 may be a mobile phone or smartphone, or a moving apparatus like a car. The electronic apparatus 200 may be a mouse or loudspeaker which has no secondary battery and operates with received power.

(Arrangement of Power Supply Apparatus 100)

Figure 2:
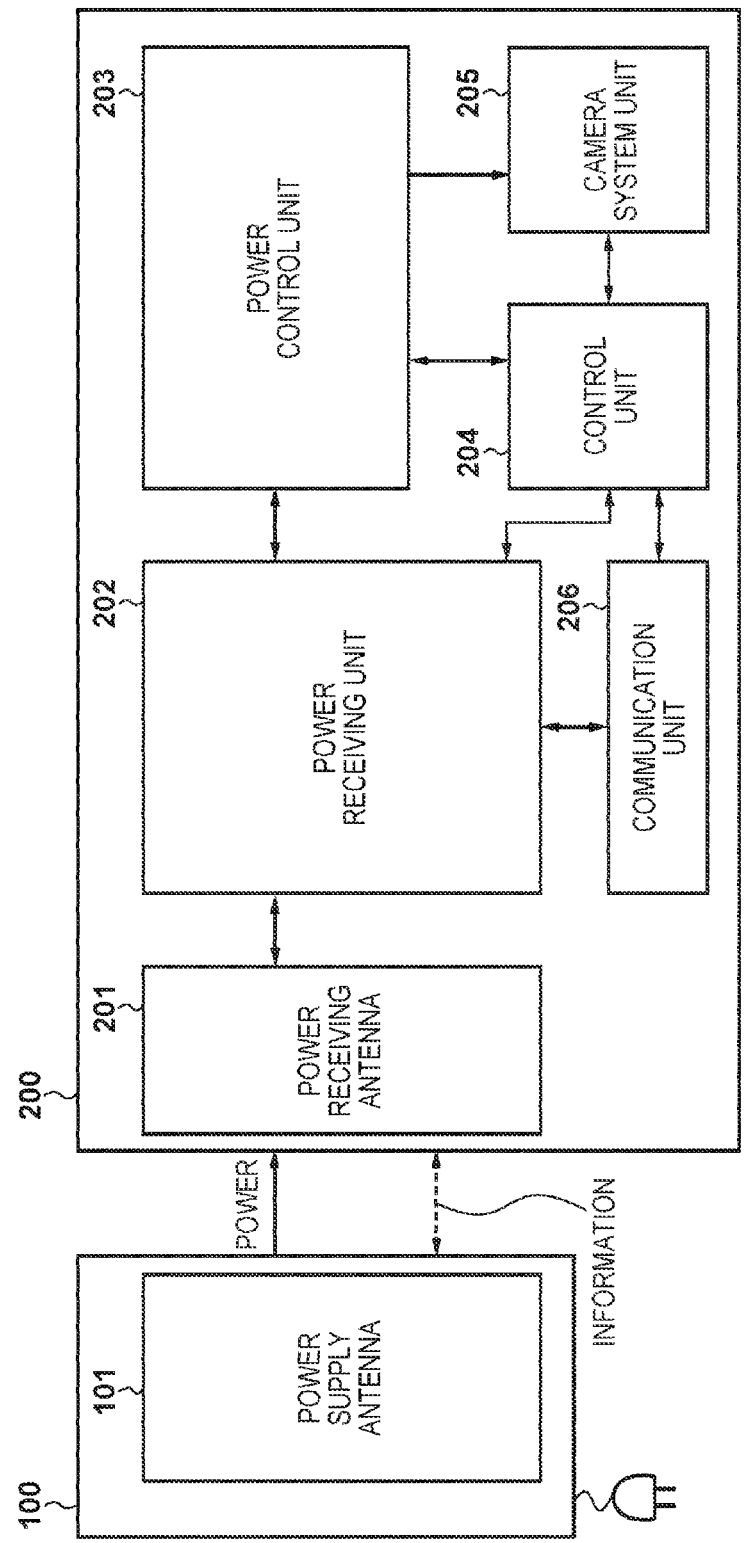
FIG. 2 is a block diagram for illustrating an example of the configuration of the wireless power supply system in the first and second embodiments.

FIG. 2 is a block diagram showing an example of a configuration of the wireless power supply system including the power supply apparatus 100 and the electronic apparatus 200.

As shown in FIG. 2, the power supply apparatus 100 outputs AC power generated in the power supply apparatus 100 to the electronic apparatus 200 via the power supply antenna 101.

Power generated by the power supply apparatus 100 includes the first power and the second power. The first power is power for communication for transmitting, to the electronic apparatus 200, a command for controlling the electronic apparatus 200 by the power supply apparatus 100. The second power is larger than the first power, and is power necessary to cause the electronic apparatus 200 to charge the secondary battery 404 and cause the electronic apparatus 200 to operate a camera system unit 205. For example, the first power is a power of 1 W or less, and the second power is a power of 1 W to 10 W.

The power supply apparatus 100 transmits a command to the electronic apparatus 200 via the power supply antenna 101, and receives a response to the command transmitted to the electronic apparatus 200 via the power supply antenna 101 and a command transmitted from the electronic apparatus 200.

Note that, in a case where the power supply apparatus 100 supplies the first power to the electronic apparatus 200, it can transmit a command to the electronic apparatus 200. However, in a case where the power supply apparatus 100 supplies the second power to the electronic apparatus 200, it cannot transmit a command to the electronic apparatus 200.

The first power is power set so that the power supply apparatus 100 can transmit a command to any apparatus other than the electronic apparatus 200.

A command transmitted by the power supply apparatus 100 is a command complying with a predetermined communication protocol. The predetermined communication protocol is a communication protocol complying with ISO/IEC 18092 standard such as RFID (Radio Frequency IDentification). Alternatively, the predetermined communication protocol may be a communication protocol complying with NFC (Near Field Communication) standard. The command transmitted by the power supply apparatus 100 is superimposed on the first power and transmitted to the electronic apparatus 200.

A pulse signal transmitted to the electronic apparatus 200 is analyzed by the electronic apparatus 200, and detected as bit data containing information of "1" and information of "0". Note that the command includes identification information for identifying a destination and a command code indicating an operation instructed by the command. Note that the power supply apparatus 100 can transmit a command to the electronic apparatus 200 by changing the identification information included in the command. The power supply apparatus 100 can also transmit a command to the electronic apparatus 200 and apparatuses other than the electronic apparatus 200 by changing the identification information included in the command.

Power output from the power supply antenna 101 is AC power. The power supply apparatus 100 resonates at a frequency f of the power output from the power supply antenna 101. The frequency f will be referred to as a "resonance frequency f" hereinafter. The resonance frequency f is set based on the power supply antenna 101, the resonance circuit in the power supply apparatus 100, the housing of the power supply apparatus 100, and the parasitic factor of an external circuit.

The relationship between the resonance frequency f, an inductance L, and a capacitance C is given by:

$$f = \frac{1}{2\pi\sqrt{LC}} \quad (1)$$

where L represents an inductance value of the power supply antenna 101 and an external parasitic factor, and C represents an capacitance value of an parasitic factor and the resonance circuit included in the power supply apparatus 100.

In the first and second embodiments, the following description assumes that the resonance frequency f is 13.56 MHz.

(Arrangement of Electronic Apparatus 200)

An example of an arrangement of the electronic apparatus 200 will be described with reference to FIG. 2. Note that the following description will be given by exemplifying a digital still camera as the electronic apparatus 200.

The electronic apparatus 200 includes the power receiving antenna 201, a power receiving unit 202, a power control unit 203, a control unit 204, the camera system unit 205, and a communication unit 206.

The power receiving antenna 201 is an antenna for receiving power supplied from the power supply apparatus 100. The electronic apparatus 200 receives power and a command from the power supply apparatus 100 via the power receiving antenna 201. Furthermore, the electronic apparatus 200 transmits, via the power receiving antenna 201, a command for controlling the power supply apparatus 100 and a response to the command received from the power supply apparatus 100.

The power receiving unit 202 supplies the power received by the power receiving antenna 201 to one of the power control unit 203 and communication unit 206. In response to an instruction from the control unit 204, the power receiving unit 202 switches the connection destination of the power receiving antenna 201 between the power control unit 203 and the communication unit 206. The resonance frequency of the electronic apparatus 200 coincides with the resonance frequency f of the power supply apparatus 100. The power receiving unit 202 will be described later with reference to FIG. 3.

In a case where the power receiving antenna 201 and the power control unit 203 are connected by the power receiving unit 202, the power received by the power receiving antenna 201 is supplied to the power control unit 203 via the power receiving unit 202. Furthermore, the power control unit 203 charges the secondary battery 404 using the power supplied via the power receiving unit 202. The power control unit 203 supplies power to the camera system unit 205 using the power supplied via the power receiving unit 202. The power control unit 203 will be described later with reference to FIG. 4.

The control unit 204 can control the components which the electronic apparatus 200 has.

The control unit 204 is a CPU (Central Processing Unit) which operates with low power consumption. The control unit 204 operates using, for example, a power of several mW. The control unit 204 may operate using the power supplied from the secondary battery 404 or the power received by the power receiving antenna 201. The control unit 204 may operate using, for example, part of power supplied from the power receiving antenna 201 to the communication unit 206. The control unit 204 exchanges data with the camera system unit 205, and transmits the data acquired from the camera system unit 205 to the power supply apparatus 100 by using the communication unit 206. The control unit 204 also accesses the register of the communication unit 206 to confirm whether the communication unit 206 has started communication and confirm the communication state of the communication unit 206.

The camera system unit 205 includes an image capture unit for generating image data from an optical image of an object, a recording unit for storing image data generated by the image capture unit, and a playback unit for playing back the image data. The communication unit 206 wirelessly communicates with the power supply apparatus 100 via the power receiving antenna 201. A command received by the communication unit 206 is a command complying with the above-described predetermined communication protocol. A command transmitted by the communication unit 206 is a command complying with the above-described predetermined communication protocol. A response transmitted by the communication unit 206 is a command complying with the above-described predetermined communication protocol.

The communication unit 206 can also communicate with an apparatus complying with the same communication protocol as that supported by the power supply apparatus 100.

(Arrangement of Power Receiving Unit 202)

Figure 3:
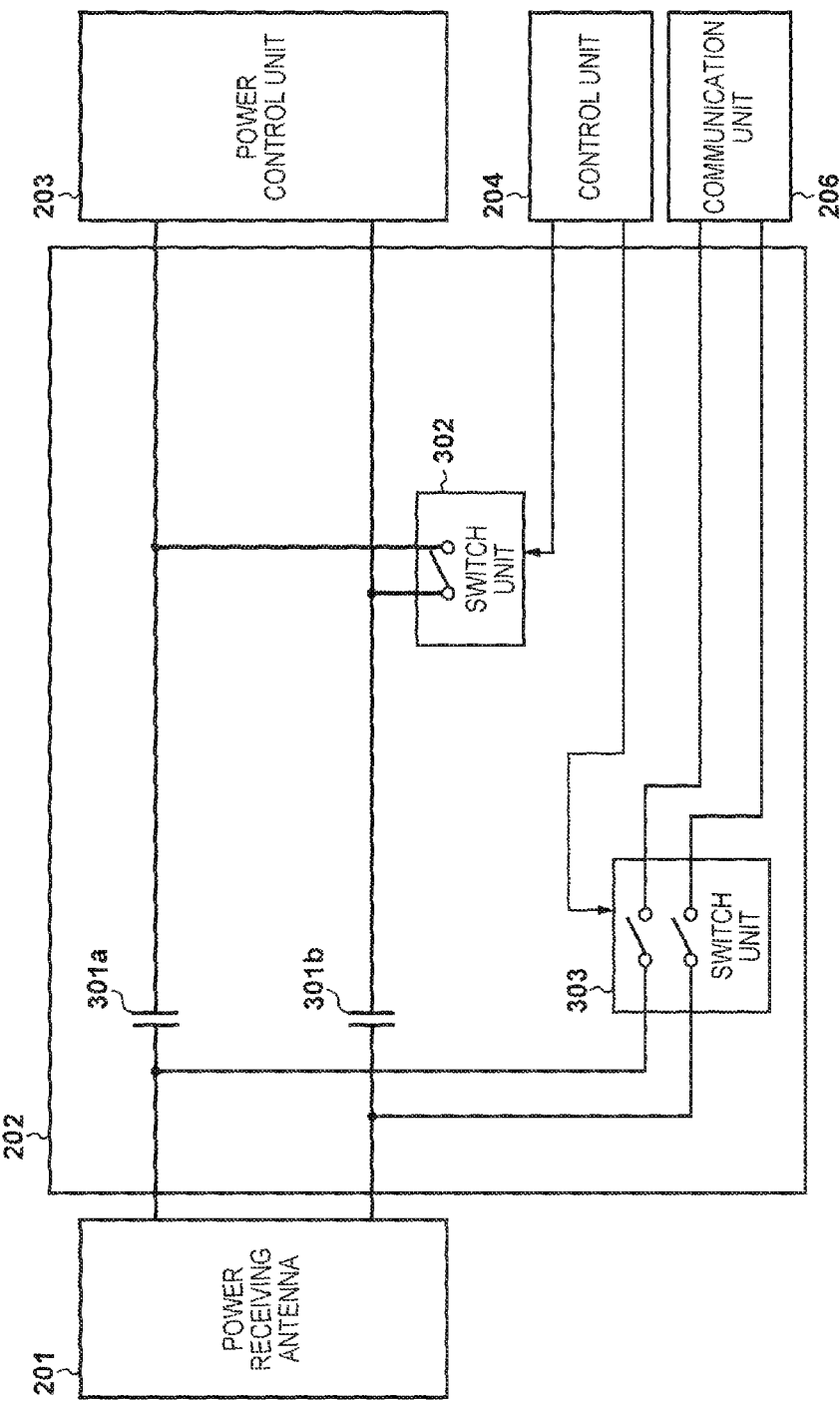
FIG. 3 is a diagram for illustrating an example of an arrangement of a power receiving unit 202 in the first embodiment.

The power receiving unit 202 will be described with reference to FIG. 3. FIG. 3 is a diagram for illustrating an example of an arrangement of the power receiving unit 202.

The power receiving unit 202 includes resonant elements 301a and 301b and the switch units 302 and 303. The switch unit 302 is arranged near the power control unit 203, and the switch unit 303 is arranged near the communication unit 206.

In a case where the power receiving antenna 201 is a coil, the resonant elements 301a and 301b are capacitors. Therefore, in the first embodiment, the following description assumes that the resonant elements 301a and 301b are capacitors. The power receiving unit 202 may further include a coil in addition to the resonant elements 301a and 301b.

The switch units 302 and 303 are used to set the connection destination of the power receiving antenna 201 to the power control unit 203 or the communication unit 206. Furthermore, the switch units 302 and 303 are used to switch connection between the power receiving antenna 201 and the resonant elements 301a and 301b. When the switch units 302 and 303 are ON (conductive state), the resonant elements 301a and 301b are connected to the power receiving antenna 201 in parallel. When the switch units 302 and 303 are OFF (non-conductive state), the resonant elements 301a and 301b are connected to the power receiving antenna 201 in series.

Each of the switch units 302 and 303 is formed by, for example, one or more FETs (Field Effect Transistors) and the like. Each of the switch units 302 and 303 may be formed by a relay switch or the like other than an FET (Field Effect Transistor).

The switch units 302 and 303 are connected to, for example, the control unit 204, and controlled in accordance with a control signal from the control unit 204.

The switch unit 302 is connected between the power control unit 203 and the resonant elements 301a and 301b. The switch unit 302 is connected to the input terminals of the power control unit 203. When the control unit 204 turns on the switch unit 302 (conductive state), the switch unit 302 is connected to short-circuit the power control unit 203. Therefore, when the switch unit 302 is ON (conductive state), the power received by the power receiving antenna 201 is not supplied to the power control unit 203. Alternatively, in a case where the control unit 204 turns off the switch unit 302 (non-conductive state), the switch unit 302 connects the power receiving antenna 201 and power control unit 203. When the switch unit 302 is OFF (non-conductive state), the power received by the power receiving antenna 201 is supplied to the power control unit 203. While the power supply apparatus 100 outputs the second power, the control unit 204 controls the switch unit 302 to supply the power received by the power receiving antenna 201 to the power control unit 203.

The switch unit 303 is connected between the communication unit 206 and the power receiving antenna 201. When the control unit 204 turns on the switch unit 303 (conductive state), the communication unit 206 and the power receiving antenna 201 are connected to each other. Therefore, when the switch unit 303 is ON (conductive state), the power received by the power receiving antenna 201 is supplied to the communication unit 206. Alternatively, in a case where the control unit 204 turns off the switch unit 303 (non-conductive state), the connection between the communication unit 206 and the power receiving antenna 201 is disconnected. Therefore, when the switch unit 303 is OFF (non-conductive state), the power received by the power receiving antenna 201 is not supplied to the communication unit 206. While the power supply apparatus 100 outputs the first power, the control unit 204 controls the switch unit 303 to supply the power received by the power receiving antenna 201 to the communication unit 206.

The control unit 204 determines whether the current period is a communication period during which the power supply apparatus 100 outputs the first power or a power supply period during which the power supply apparatus 100 outputs the second power. If it is determined that the current period is the communication period, the control unit 204 controls to turn on the switch units 302 (conductive state) and 303 in accordance with the determination result. If it is determined that the current period is the power supply period, the control unit 204 controls to turn off the switch units 302 (non-conductive state) and 303 in accordance with the determination result.

The switch units 302 and 303 will be described later with reference to FIGS. 7A to 7F and 8.

The electronic apparatus 200 has a power supply mode and communication mode as operation modes. When the electronic apparatus 200 is in the power supply mode, it causes a charging control unit 403 to charge the secondary battery 404 using the power output from the power supply apparatus 100. Furthermore, when the electronic apparatus 200 is in the power supply mode, it may operate the camera system unit 205 using the power output from the power supply apparatus 100. When the electronic apparatus 200 is in the power supply mode, the control unit 204 turns off the switch units 302 and 303 (non-conductive state). When the electronic apparatus 200 is in the communication mode, the electronic apparatus 200 causes the communication unit 206 to perform wireless communication using the power output from the power supply apparatus 100. When the electronic apparatus 200 is in the communication mode, the control unit 204 turns on the switch units 302 and 303 (conductive state).

(Arrangement of Power Control Unit 203)

Figure 4:
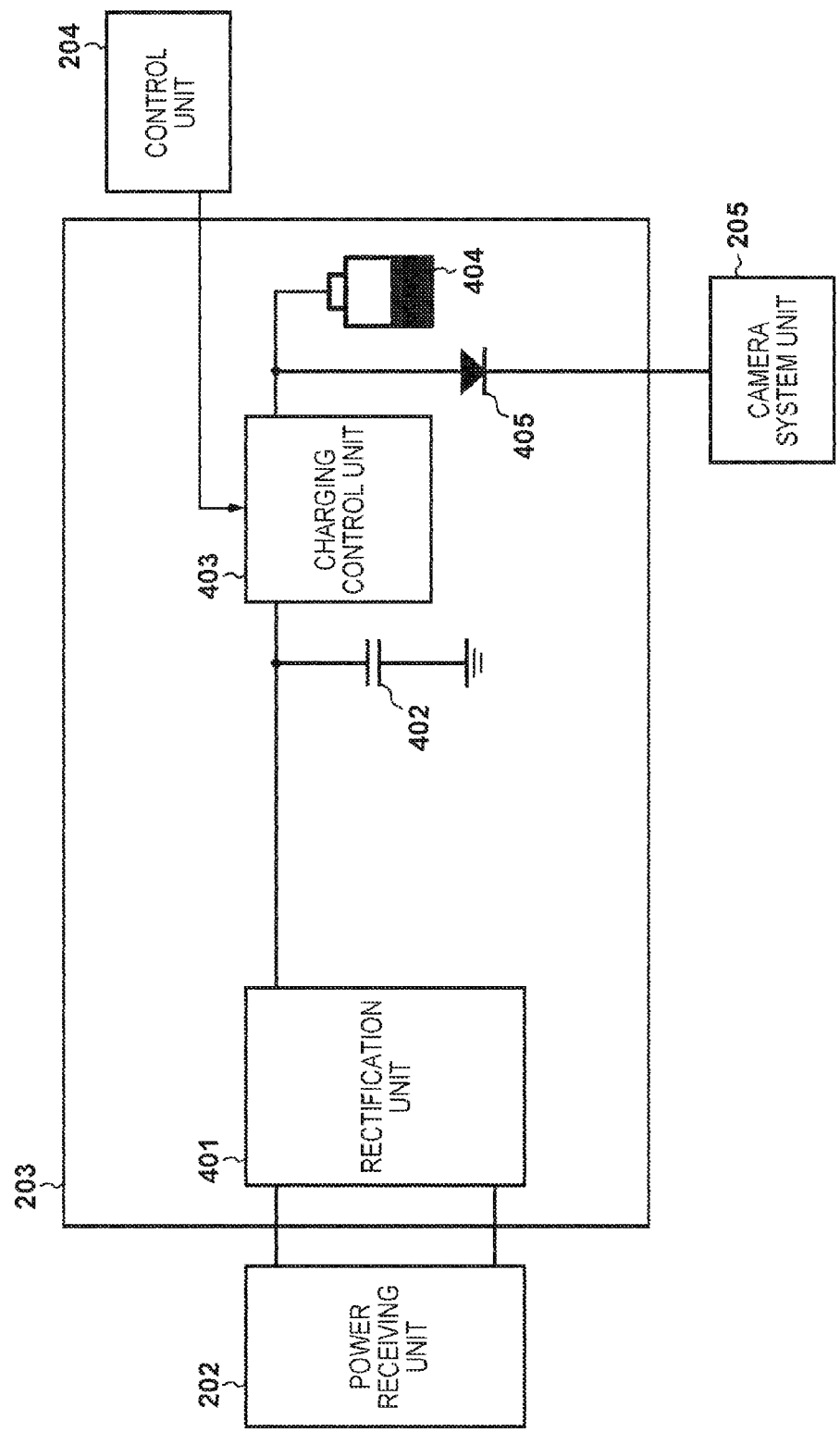
FIG. 4 is a diagram for illustrating an example of an arrangement of a power control unit 203 in the first embodiment.

The power control unit 203 will be described with reference to FIG. 4. FIG. 4 is a diagram showing an example of an arrangement of the power control unit 203.

The power control unit 203 includes a rectification unit 401, a smoothing capacitor 402, the charging control unit 403, the secondary battery 404, and a diode 405.

The power receiving unit 202 supplies the AC power received by the power receiving antenna 201 to the power control unit 203.

The rectification unit 401 includes a diode. The rectification unit 401 is, for example, a full-wave rectifier circuit using four diodes. Alternatively, the rectification unit 401 may be a half-wave rectifier circuit using one diode. The rectification unit 401 smoothes the AC power supplied from the power receiving unit 202 using the smoothing capacitor 402, and converts it into DC power.

The smoothing capacitor 402 includes, for example, an electrolytic capacitor and ceramic capacitor. The capacitance of the smoothing capacitor 402 falls within, for example, a range from 22 µF to 100 µF. The DC power converted by the smoothing capacitor 402 is supplied to the charging control unit 403.

The charging control unit 403 charges the secondary battery 404 using the DC power supplied from the smoothing capacitor 402. The charging control unit 403 charges the secondary battery 404 by, for example, performing constant current/constant voltage control.

The charging control unit 403 is connected to the control unit 204, and configured to perform serial communication. The control unit 204 accesses the register of the charging control unit 403 to set the value of a charging current and the value of a charging voltage to the secondary battery 404. Furthermore, the control unit 204 acquires charge state information indicating a method of charging the secondary battery 404 by accessing the register of the charging control unit 403. The charge state information includes information indicating a trickle charge or boost charge as information indicating a method of charging the secondary battery 404.

The secondary battery 404 is a chargeable battery such as a lithium ion battery. The secondary battery 404 can supply power to the camera system unit 205 via the diode 405.

The diode 405 is, for example, a Schottky diode or the like. The diode 405 is arranged between the camera system unit 205 and the secondary battery 404. The diode 405 is used to prevent back-flow of a current from the camera system unit 205 to the secondary battery 404.

(Control Process)

A control process executed by the control unit 204 in the first and second embodiments will be described with reference to FIG. 5.

In step S501, the control unit 204 determines whether the operation mode of the electronic apparatus 200 is the communication mode. For example, the control unit 204 determines whether the operation mode of the electronic apparatus 200 is the communication mode by determining whether the current period is the communication period. In this case, if the current period is the communication period, the control unit 204 determines that the operation mode of the electronic apparatus 200 is the communication mode. If the current period is not the communication period, the control unit 204 determines that the operation mode of the electronic apparatus 200 is not the communication mode.

Furthermore, for example, the control unit 204 detects the voltage of the end of the power receiving antenna 201 to determine whether the operation mode of the electronic apparatus 200 is the communication mode. In this case, if a communication carrier is detected by the voltage of the end of the power receiving antenna 201, the control unit 204 determines that the operation mode of the electronic apparatus 200 is the communication mode. In this case, if no communication carrier is detected by the voltage of the end of the power receiving antenna 201, the control unit 204 determines that the operation mode of the electronic apparatus 200 is not the communication mode.

Furthermore, for example, depending on whether a command for performing wireless communication has been received from a communication apparatus other than the power supply apparatus 100, the control unit 204 determines whether the operation mode of the electronic apparatus 200 is the communication mode. In this case, if a command for performing wireless communication has been received from a communication apparatus other than the power supply apparatus 100, the control unit 204 determines that the operation mode of the electronic apparatus 200 is the communication mode. If no command for performing wireless communication has been received from a communication apparatus other than the power supply apparatus 100, the control unit 204 determines that the operation mode of the electronic apparatus 200 is not the communication mode.

If the control unit 204 determines that the operation mode of the electronic apparatus 200 is not the communication mode, it performs a process of step S502. If the control unit 204 determines that the operation mode of the electronic apparatus 200 is the communication mode, it performs a process of step S503.

In step S502, the control unit 204 determines whether the operation mode of the electronic apparatus 200 is the power supply mode. For example, the control unit 204 determines whether the operation mode of the electronic apparatus 200 is the power supply mode by determining whether the current period is the power supply period. In this case, if the current period is the power supply period, the control unit 204 determines that the operation mode of the electronic apparatus 200 is the power supply mode. If the current period is not the power supply period, the control unit 204 determines that the operation mode of the electronic apparatus 200 is not the power supply mode.

Furthermore, for example, depending on whether the voltage of the end of the power receiving antenna 201 is equal to or higher than a predetermined value, the control unit 204 determines whether the operation mode of the electronic apparatus 200 is the power supply mode. In this case, if the voltage of the end of the power receiving antenna 201 is equal to or higher than the predetermined value, the control unit 204 determines that the operation mode of the electronic apparatus 200 is the power supply mode. If the voltage of the end of the power receiving antenna 201 is lower than the predetermined value, the control unit 204 determines that the operation mode of the electronic apparatus 200 is not the power supply mode. If the control unit 204 determines that the operation mode of the electronic apparatus 200 is the power supply mode, it performs a process of step S506. If the control unit 204 determines that the operation mode of the electronic apparatus 200 is not the power supply mode, it returns to the process of step S501.

In step S503, the control unit 204 turns on the switch units 302 and 303 to set the operation mode of the electronic apparatus 200 to the communication mode. In this case, the control unit 204 performs a process of step S504.

In step S504, the control unit 204 determines whether communication by the communication unit 206 has ended. If it is determined that communication by the communication unit 206 has ended, the control unit 204 performs a process of step S505. If it is determined that communication has not ended, the control unit 204 returns to the process of step S504.

In step S505, the control unit 204 determines whether to terminate the control process shown in FIG. 5. For example, by determining whether to change the operation mode of the electronic apparatus 200 to the power supply mode, the control unit 204 determines whether to terminate the control process shown in FIG. 5. If the remaining capacity of the secondary battery 404 is not full, the control unit 204 determines to change the operation mode of the electronic apparatus 200 to the power supply mode, and then determines not to terminate the control process shown in FIG. 5. If the remaining capacity of the secondary battery 404 is full, the control unit 204 determines not to change the operation mode of the electronic apparatus 200 to the power supply mode, and then determines to terminate the control process shown in FIG. 5. In a case where the camera system unit 205 is operated, the control unit 204 determines to change the operation mode of the electronic apparatus 200 to the power supply mode, and then determines not to terminate the control process shown in FIG. 5. Alternatively, in a case where the camera system unit 205 is not operated, the control unit 204 determines not to change the operation mode of the electronic apparatus 200 to the power supply mode, and then determines to terminate the control process shown in FIG. 5. If an error has occurred in the electronic apparatus 200, the control unit 204 determines not to change the operation mode of the electronic apparatus 200 to the power supply mode, and then determines to terminate the control process shown in FIG. 5. Alternatively, if no error has occurred in the electronic apparatus 200, the control unit 204 determines to change the operation mode of the electronic apparatus 200 to the power supply mode, and then determines not to terminate the control process shown in FIG. 5.

If it is determined to terminate the control process shown in FIG. 5, the control unit 204 terminates the control process shown in FIG. 5. If it is determined not to terminate the control process shown in FIG. 5, the control unit 204 performs the process of step S506.

In step S506, the control unit 204 turns off the switch units 302 and 303 (non-conductive state) to change the operation mode of the electronic apparatus 200 to the power supply mode. In this case, the control unit 204 performs the process of step S507.

In step S507, the control unit 204 determines whether power supply from the power supply apparatus 100 has ended. For example, by determining whether the current period is the power supply period, the control unit 204 determines whether power supply from the power supply apparatus 100 has ended. In this case, if the current period is the power supply period, the control unit 204 determines that power supply from the power supply apparatus 100 has not ended. If the current period is not the power supply period, the control unit 204 determines that power supply from the power supply apparatus 100 has ended.

Furthermore, for example, depending on whether the voltage of the end of the power receiving antenna 201 is lower than the predetermined value, the control unit 204 determines whether power supply from the power supply apparatus 100 has ended. In this case, if the voltage of the end of the power receiving antenna 201 is lower than the predetermined value, the control unit 204 determines that power supply from the power supply apparatus 100 has ended. If the voltage of the end of the power receiving antenna 201 is equal to or higher than the predetermined value, the control unit 204 determines that power supply from the power supply apparatus 100 has not ended. If power supply from the power supply apparatus 100 has not ended, the control unit 204 performs the process of step S507 again. If power supply from the power supply apparatus 100 has ended, the control unit 204 performs the process of step S508.

In step S508, similarly to step S505, the control unit 204 determines whether to terminate the control process shown in FIG. 5. If it is determined to terminate the control process shown in FIG. 5, the control unit 204 terminates the control process shown in FIG. 5. If it is determined not to terminate the control process shown in FIG. 5, the control unit 204 performs the process of step S503 again.

A relationship between the power receiving antenna 201, the power control unit 203, and the communication unit 206 will be described with reference to FIGS. 6A and 6B.

Figure 6A:
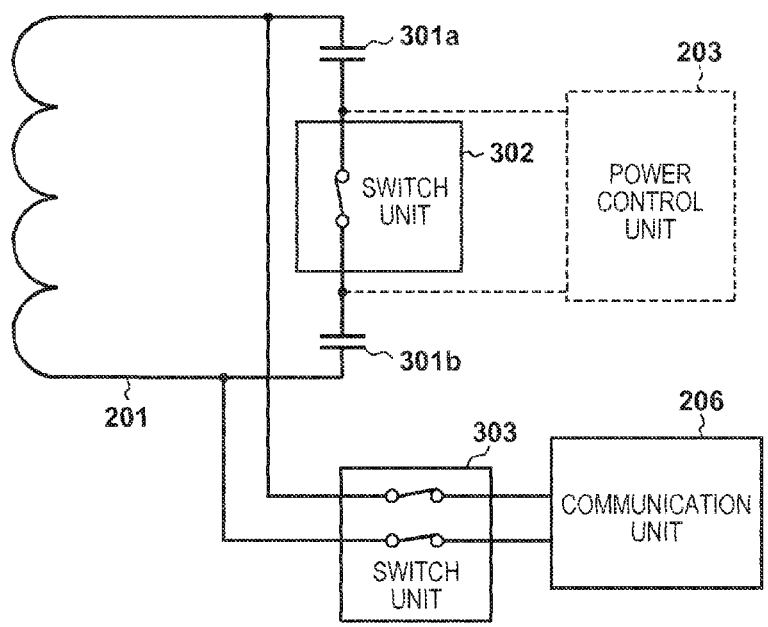
FIGS. 6A and 6B are diagrams for illustrating examples of a relationship between a power receiving antenna 201, the power control unit 203, and a communication 206 unit in the first and second embodiments.

FIG. 6A is a diagram showing a relationship between the power receiving antenna 201, the power control unit 203, and the communication unit 206 when the electronic apparatus 200 is in the communication mode.

Figure 6B:
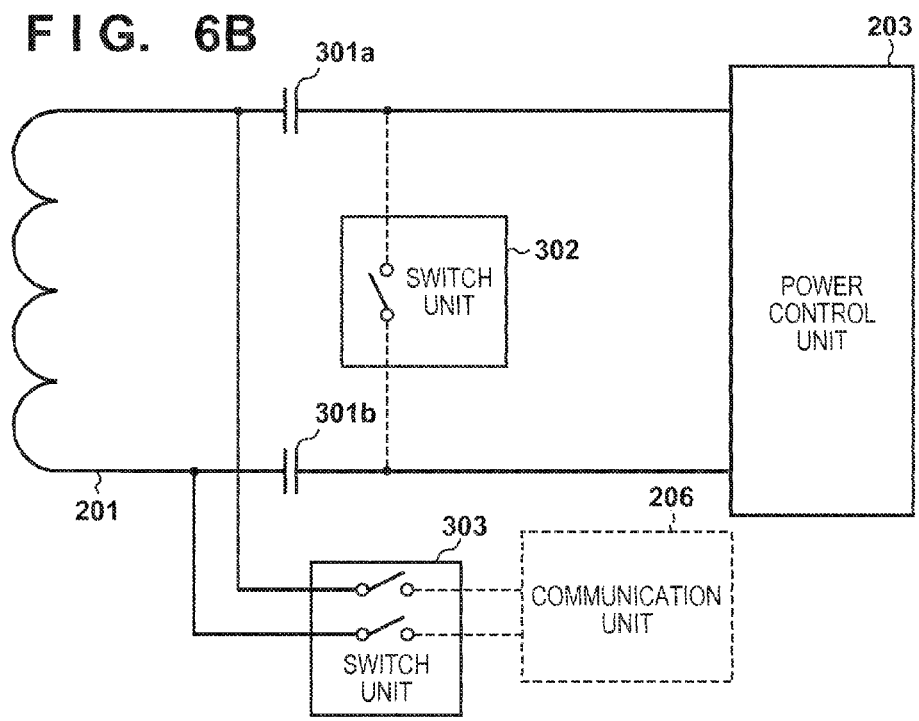

FIG. 6B is a diagram showing a relationship between the power receiving antenna 201, the power control unit 203, and the communication unit 206 when the electronic apparatus 200 is in the power supply mode.

As shown in FIG. 6A, when the electronic apparatus 200 is in the communication mode, the control unit 204 controls to turn on the switch units 302 and 303 (conductive state). The switch unit 302 short-circuits the input terminals of the power control unit 203. With this operation, when the electronic apparatus 200 is in the communication mode, the power received by the power receiving antenna 201 is not supplied to the power control unit 203. Note that the power received by the power receiving antenna 201 is supplied to the communication unit 206. In this case, the resonant element 301a is connected to the power receiving antenna 201 in parallel, and the resonant element 301b is connected to the power receiving antenna 201 in parallel. Thus, the resonant elements 301a and 301b form a parallel resonance circuit with respect to the power receiving antenna 201.

As shown in FIG. 6B, if the electronic apparatus 200 is in the power supply mode, the control unit 204 controls to turn off the switch units 302 and 303 (non-conductive state). In this case, since the switch units 302 and 303 are opened, when the electronic apparatus 200 is in the power supply mode, the power received by the power receiving antenna 201 is supplied to the power control unit 203. However, the power received by the power receiving antenna 201 is not supplied to the communication unit 206. In this case, the power receiving antenna 201 and the resonant element 301a are connected in series, and the power receiving antenna 201 and the resonant element 301b are connected in series. Thus, the resonant elements 301a and 301b form a series resonance circuit with respect to the power receiving antenna 201.

Note that the switch unit 303 is opened in FIGS. 6A and 6B for the sake of convenience. However, since a state in which the switch unit 303 is open indicates a state in which no power is supplied to the communication unit 206, the switch unit 303 need not always be open.

As described above, the control unit 204 can switch the connection destination of the power receiving antenna 201 between the communication unit 206 and the power control unit 203 by controlling the switch units 302 and 303. Furthermore, the control unit 204 can switch the connection between the power receiving antenna 201 and the resonant elements 301a and 301b by controlling the switch units 302 and 303. This enables the control unit 204 to control whether the power receiving antenna 201 is connected to the series resonance circuit or the parallel resonance circuit. Consequently, when the electronic apparatus 200 is in the communication mode, the parallel resonance circuit is connected to the power receiving antenna 201, and thus the control unit 204 can improve the communication sensitivity of the communication unit 206. Furthermore, if the electronic apparatus 200 is in the power supply mode, the series resonance circuit is connected to the power receiving antenna 201, and thus the control unit 204 can reduce the loss of power supplied from the power supply apparatus 100, thereby improving the power supply efficiency.

The switch units 302 and 303 will be described with reference to FIGS. 7A to 7F.

FIGS. 7A to 7F show arrangements of the switch unit 302 when FETs are used and that of the switch unit 303 when FETs are used. In FIGS. 7A to 7F, power lines connected to the power control unit 203 and communication lines connected to the communication unit 206 are connected to the ground (GND) via the FETs.

Figure 7B:
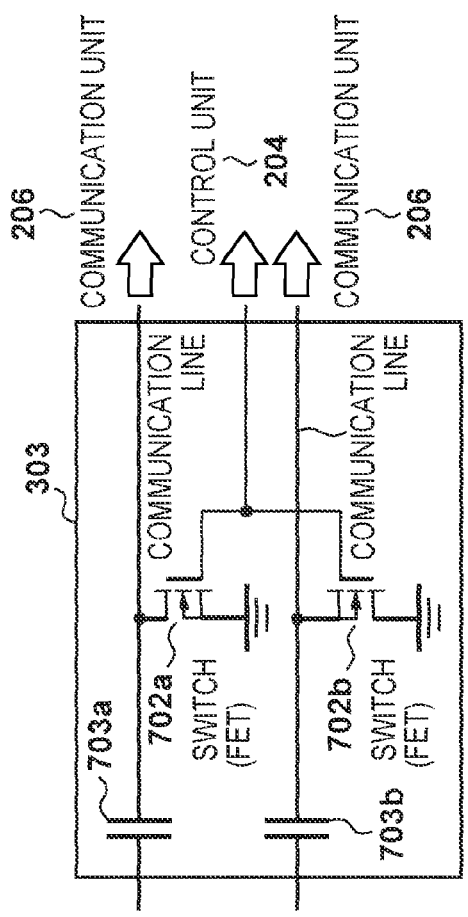
FIGS. 7A to 7F are diagrams for illustrating examples of arrangements of switch units 302 and 303 in the first and second embodiments.
Figure 7A:
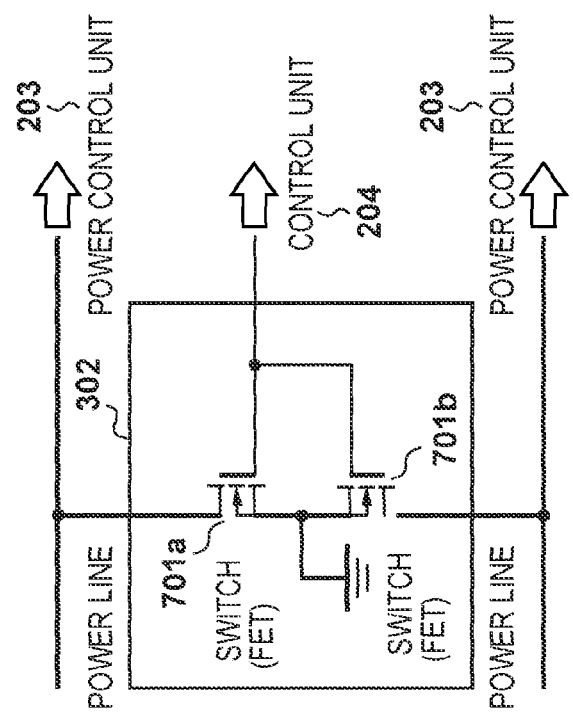
Figure 7C:
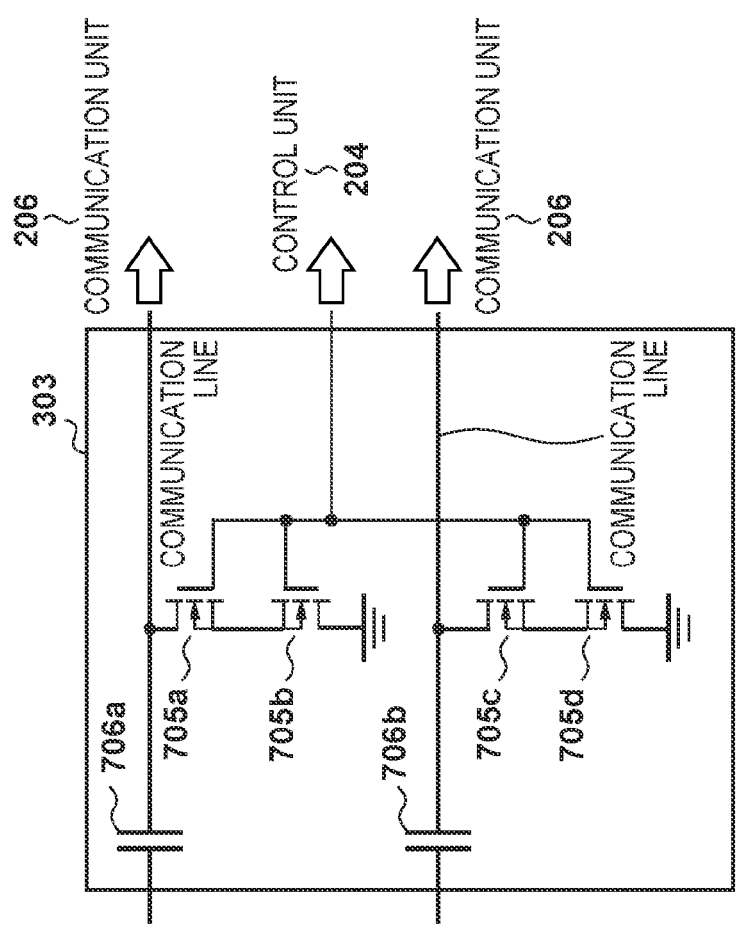
Figure 7D:
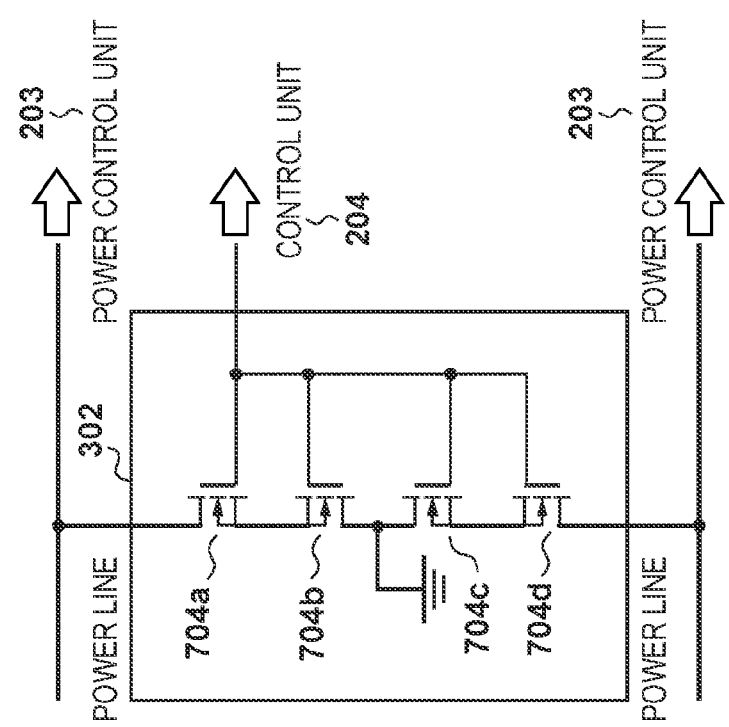
Figure 7E:
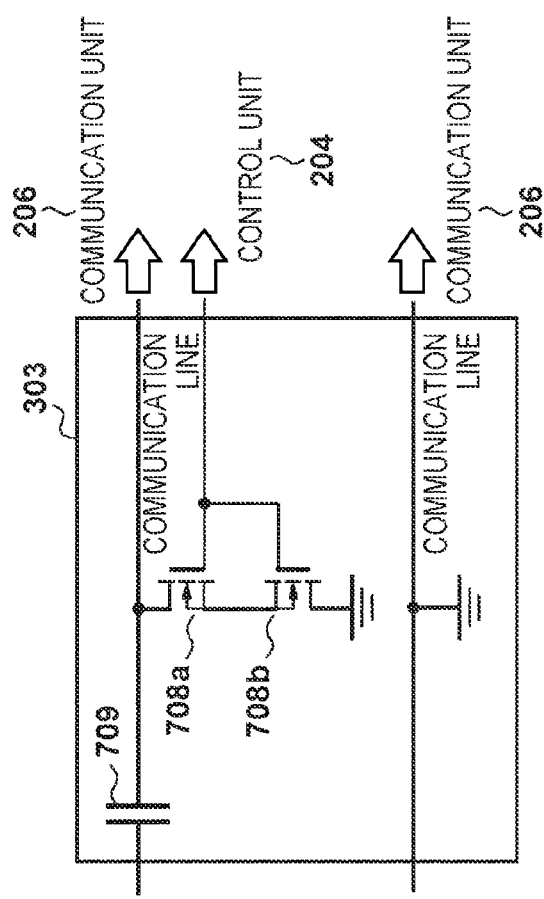
Figure 7F:
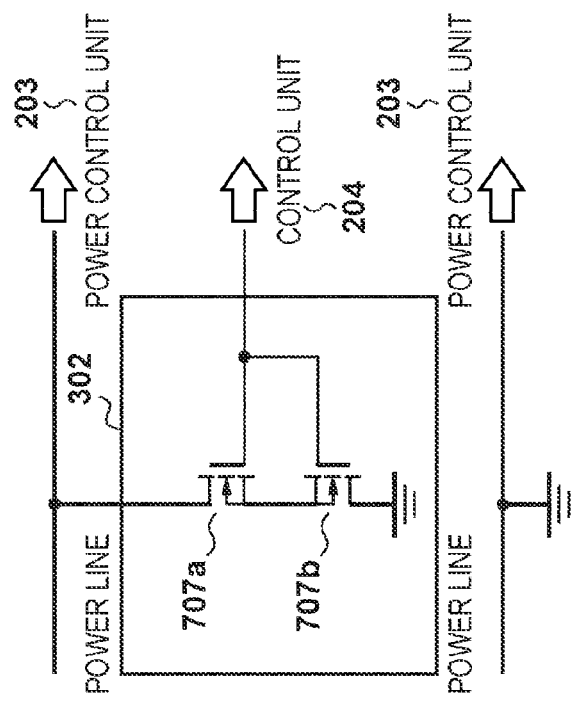

FIG. 7A shows an arrangement of the switch unit 302 when two FETs are used. FIG. 7B shows an arrangement of the switch unit 303 when two FETs are used. FIG. 7C shows an arrangement of the switch unit 302 when four FETs are used. FIG. 7D shows an arrangement of the switch unit 303 when four FETs are used. FIG. 7E shows an arrangement of the switch unit 302 when two FETs are used for one power line. FIG. 7F shows an arrangement of the switch unit 303 when two FETs are used for one communication line.

As shown in FIG. 7A, the switch unit 302 includes FETs 701a and 701b. The FETs 701a and 701b are N-channel FETs. The gates of the FETs 701a and 701b are connected to the control unit 204. The drain of the FET 701a is connected to one of the power lines connected to the power control unit 203, and the drain of the FET 701b is connected to the other power line connected to the power control unit 203. The sources of the FETs 701a and 701b are connected to the GND.

If the voltage level of a control signal from the control unit 204 exceeds the threshold of the gates of the FETs 701a and 701b, the GND and the two power lines connected to the power control unit 203 are connected. In this case, one power line connected to the power control unit 203 is connected to the GND via the FET 701a, and the other power line connected to the power control unit 203 is connected to the GND via the FET 701b. When the switch unit 302 is ON (conductive state), one power line connected to the power control unit 203 is connected to the GND via the FET 701a, and the other power line connected to the power control unit 203 is connected to the GND via the FET 701b.

If the voltage level of the control signal from the control unit 204 is lower than the threshold of the gates of the FETs 701a and 701b, the GND and the two power lines connected to the power control unit 203 are not connected. In this case, one power line connected to the power control unit 203 is not connected to the GND via the FET 701a, and the other power line connected to the power control unit 203 is not connected to the GND via the FET 701b. When the switch unit 302 is OFF (non-conductive state), one power line connected to the power control unit 203 is not connected to the GND via the FET 701a, and the other power line connected to the power control unit 203 is not connected to the GND via the FET 701b.

As shown in FIG. 7B, the switch unit 303 includes FETs 702a and 702b and capacitors 703a and 703b. The capacitors 703a and 703b are capacitors (attenuation elements) for power attenuation. The capacitance of the capacitor 703a is a small capacitance of, for example, 100 pF or less. The capacitance of the capacitor 703b is a small capacitance of, for example, 100 pF or less. One terminal of the capacitor 703a is connected to the power receiving antenna 201, and the other terminal of the capacitor 703a is connected to one communication line of the communication unit 206 in series. One terminal of the capacitor 703b is connected to the power receiving antenna 201, and the other terminal of the capacitor 703b is connected to the other communication line of the communication unit 206 in series. The FETs 702a and 702b are N-channel FETs. The gates of the FETs 702a and 702b are connected to the control unit 204. The drain of the FET 702a is connected to one communication line connected to the communication unit 206, and the drain of the FET 702b is connected to the other communication line connected to the communication unit 206. The sources of the FETs 702a and 702b are connected to the GND.

If the voltage level of the control signal from the control unit 204 is lower than the threshold of the gates of the FETs 702a and 702b, the GND and one communication line of the communication unit 206 are not connected, and the GND and the other communication line of the communication unit 206 are not connected. If the switch unit 303 is ON (conductive state), one communication line of the communication unit 206 is not connected to the GND via the FET 702a, and the other communication line of the communication unit 206 is not connected to the GND via the FET 702b.

If the voltage level of the control signal from the control unit 204 exceeds the threshold of the gates of the FETs 702a and 702b, the GND and the two communication lines connected to the communication unit 206 are connected. In this case, one communication line connected to the communication unit 206 is connected to the GND via the FET 702a, and the other communication line connected to the communication unit 206 is connected to the GND via the FET 702b. When the switch unit 303 is OFF (non-conductive state), one communication line connected to the communication unit 206 is connected to the GND via the FET 702a, and the other communication line connected to the communication unit 206 is connected to the GND via the FET 702b. Consequently, when the switch unit 303 is OFF (non-conductive state), the power received by the power receiving antenna 201 is not supplied to the communication unit 206. When the switch unit 303 is OFF (non-conductive state), the capacitors 703a and 703b and the FETs 702a and 702b increase the impedance of the switch unit 303 with respect to the impedance of the power control unit 203. Therefore, the power received by the power receiving antenna 201 is supplied to the power control unit 203. Although the capacitors 703a and 703b are used as capacitors for power attenuation in FIG. 7B, the switch unit 303 may further include a coil in addition to the capacitors 703a and 703b.

As shown in FIG. 7C, the switch unit 302 includes FETs 704a, 704b, 704c, and 704d. The FETs 704a, 704b, 704c, and 704d are N-channel FETs. The gates of the FETs 704a, 704b, 704c, and 704d are connected to the control unit 204. The drain of the FET 704a is connected to one power line of the power control unit 203, and the drain of the FET 704d is connected to the other power line of the power control unit 203. The drain of the FET 704b is connected to the GND, and the drain of the FET 704c is connected to the GND. The sources of the FETs 704a and 704b are connected to each other, and the sources of the FETs 704c and 704d are connected to each other. When the switch unit 302 is ON (conductive state), one power line connected to the power control unit 203 is connected to the GND via the FETs 704a and 704b. When the switch unit 302 is ON (conductive state), the other power line connected to the power control unit 203 is connected to the GND via the FETs 704c and 704d. When the switch unit 302 is OFF (non-conductive state), one power line connected to the power control unit 203 is not connected to the GND via the FETs 704a and 704b. When the switch unit 302 is OFF (non-conductive state), the other power line connected to the power control unit 203 is not connected to the GND via the FETs 704c and 704d.

In FIG. 7C, to improve isolation between each power line and the GND when each FET is non-conductive, the FETs 704a, 704b, 704c, and 704d are used. In this case, the parasitic body diode of each of the FETs 704a, 704b, 704c, and 704d is reversed between the corresponding power line and the GND.

As shown in FIG. 7D, the switch unit 303 includes FETs 705a, 705b, 705c, and 705d, and capacitors 706a and 706b. The FETs 705a, 705b, 705c, and 705d are N-channel FETs. The capacitors 706a and 706b are capacitors (attenuation elements) for power attenuation. The capacitances of the capacitors 706a and 706b are small capacitances of, for example, 100 pF or less. The gates of the FETs 705a, 705b, 705c, and 705d are connected to the control unit 204. The drain of the FET 705a is connected to one communication line of the communication unit 206 and the drain of the FET 705c is connected to the other communication line of the communication unit 206. The drain of the FET 705b is connected to the GND, and the drain of the FET 705d is connected to the GND. The sources of the FETs 705a and 705b are connected to each other, and the sources of the FETs 705c and 705d are connected to each other.

When the switch unit 303 is ON (conductive state), one communication line connected to the communication unit 206 is not connected to the GND via the FETs 705a and 705b. When the switch unit 303 is ON (conductive state), the other communication line connected to the communication unit 206 is not connected to the GND via the FETs 705c and 705d. When the switch unit 303 is OFF (non-conductive state), one communication line connected to the communication unit 206 is connected to the GND via the FETs 705a and 705b. When the switch unit 303 is OFF (non-conductive state), the other communication line connected to the communication unit 206 is connected to the GND via the FETs 705c and 705d. In FIG. 7D, to improve isolation between each communication line and the GND when each FET in FIG. 7D is non-conductive, the FETs 705a, 705b, 705c, and 705d are used. In this case, the parasitic body diode of each of the FETs 705a, 705b, 705c, and 705d is reversed between the corresponding communication line and the GND.

A case in which the switch unit 302 serves as an unbalanced circuit with respect to the power receiving antenna 201 will be described with reference to FIG. 7E. One power line of the power control unit 203 is connected to the GND, thereby forming an unbalanced arrangement.

As shown in FIG. 7E, the switch unit 302 includes FETs 707a and 707b. The FETs 707a and 707b are N-channel FETs. The gates of the FETs 707a and 707b are connected to the control unit 204. The drain of the FET 707b is connected to the GND, and the drain of the FET 707a is connected to the power line of the power control unit 203, which is not connected to the GND. The sources of the FETs 707a and 707b are connected to each other. When the switch unit 302 is ON (conductive state), one power line connected to the power control unit 203 is connected to the GND via the FETs 707a and 707b. When the switch unit 302 is OFF (non-conductive state), one power line connected to the power control unit 203 is not connected to the GND via the FETs 707a and 707b. Note that the switch unit 302 includes the FETs 707a and 707b in FIG. 7E but may include one of the FETs 707a and 707b.

A case in which the switch unit 303 serves as an unbalanced circuit with respect to the power receiving antenna 201 will be described with reference to FIG. 7F. One communication line of the communication unit 206 is connected to the GND, thereby forming an unbalanced arrangement.

As shown in FIG. 7F, the switch unit 303 includes FETs 708a and 708b and a capacitor 709. The FETs 708a and 708b are N-channel FETs. The capacitor 709 is connected, in series, to the communication line of the communication unit 206, which is not connected to the GND. The gates of the FETs 708a and 708b are connected to the control unit 204. The drain of the FET 708b is connected to the GND, and the drain of the FET 708a is connected to the communication line of the communication unit 206, which is not connected to the GND. The sources of the FETs 708a and 708b are connected to each other.

When the switch unit 303 is ON (conductive state), one communication line connected to the communication unit 206 is not connected to the GND via the FETs 708a and 708b. When the switch unit 303 is OFF (non-conductive state), one communication line connected to the communication unit 206 is connected to the GND via the FETs 708a and 708b. Note that the switch unit 303 includes the FETs 708a and 708b in FIG. 7F but may include one of the FETs 708a and 708b.

As described above, as shown in FIGS. 7A to 7F, the switch units 302 and 303 are formed using N-channel FETs. Thus, the switch units 302 and 303 are configured to connect the N-channel FETs and the GND (connected to the low side). It is possible to readily form a circuit for driving the switch units 302 and 303, and the power control unit 203 can readily control the switch units 302 and 303.

According to the first embodiment, a control signal from the control unit 204 is supplied to the gates of the FETs of the switch unit 302. The first embodiment, however, is not limited to this. According to the first embodiment, for example, the switch unit 302 may include a driving transistor for driving the gates of the FETs of the switch unit 302. In this case, when a control signal is supplied from the control unit 204 to the driving transistor, a voltage to be supplied to the gates of the FETs of the switch unit 302 may be controlled.

According to the first embodiment, the control signal from the control unit 204 is supplied to the gates of the FETs of the switch unit 303. The first embodiment, however, is not limited to this. According to the first embodiment, for example, the switch unit 303 may include a driving transistor for driving the gates of the FETs of the switch unit 303. In this case, when the control signal is supplied from the control unit 204 to the driving transistor, a voltage to be supplied to the gates of the FETs of the switch unit 303 may be controlled. Furthermore, when the switch unit 303 is OFF (non-conductive state), at least one communication line of the communication unit 206 is connected to the GND by using the FETs included in the switch unit 303. The first embodiment, however, is not limited to this. When the switch unit 303 is OFF (non-conductive state), the control unit 204 may connect the two communication lines of the communication unit 206 and the power receiving antenna 201 so that the first power as carrier power necessary for wireless communication is supplied from the power receiving antenna 201 to the communication unit 206. Note that when the switch unit 303 is OFF (non-conductive state), if the carrier power is supplied from the power receiving antenna 201 to the communication unit 206, the control unit 204 controls not to supply power larger than the carrier power to the communication unit 206. In this case, even if the switch unit 303 is OFF (non-conductive state), the communication unit 206 is kept in an active state. The active state indicates a state in which the communication unit 206 can perform communication. An inactive state indicates an initial state or reset state of the communication unit 206 in which communication is not available.

FIG. 13 is a timing chart for illustrating an example of a voltage waveform of an input terminal of the communication unit 206. As shown in FIG. 13, during the power supply period, the switch unit 303 is OFF (non-conductive state), and thus the amplitude of the voltage waveform of the input terminal of the communication unit 206 becomes small. During the communication period, the switch unit 303 is ON (conductive state), and thus the amplitude of the voltage waveform of the input terminal of the communication unit 206 is large. Note that even during the power supply period, the amplitude level of the voltage waveform of the input terminal of the communication unit 206 is equal to or higher than a voltage level at which the communication unit 206 can be kept in the active state. Consequently, even during the power supply period, it is possible to keep the communication unit 206 in a wirelessly communicable state. Therefore, the electronic apparatus 200 can prevent the communication unit 206 from entering the inactive state every time the mode of the electronic apparatus 200 is changed from the communication mode to the power supply mode.

An example of an arrangement of the switch unit 303, which is different from those shown in FIGS. 7A to 7F, will be described with reference to FIG. 8.

Figure 8:
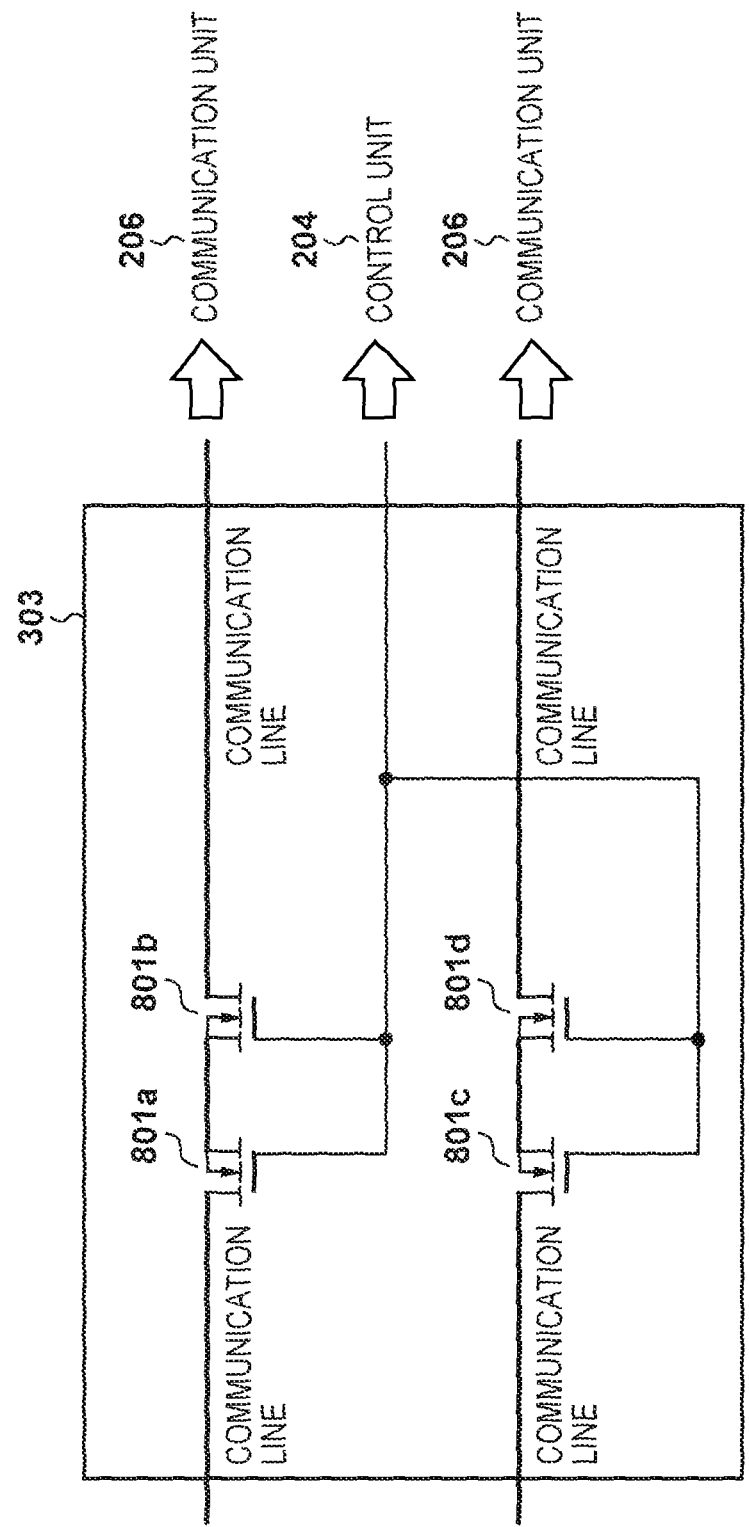
FIG. 8 is a diagram for illustrating an example of the arrangement of the switch unit 303 in the first and second embodiments.

FIG. 8 is a diagram showing a case in which the FETs are connected to one communication line of the communication unit 206 in series, and the FETs are connected to the other communication line of the communication unit 206 in series. The FETs of the switch unit 303 are connected in series between the power receiving antenna 201 serving as a power supply source and the communication unit 206 serving as a load (connected to the high side).

The switch unit 303 includes FETs 801a, 801b, 801c, and 801d. The FETs 801a, 801b, 801c, and 801d are N-channel FETs.

The switch unit 303 shown in FIG. 8 may further include a capacitor for power attenuation. The gates of the FETs 801a, 801b, 801c, and 801d are connected to the control unit 204. Furthermore, the sources of the FETs 801a and 801b are connected to one communication line of the communication unit 206, and the sources of the FETs 801c and 801d are connected to the other communication line of the communication unit 206. The sources of the FETs 801a and 801b are connected to each other, and the sources of the FETs 801c and 801d are connected to each other.

When the voltage level of a control signal from the control unit 204 is lower than the threshold of all the gates of the FETs 801a, 801b, 801c, and 801d, the communication unit 206 is not connected to the power receiving antenna 201. When the switch unit 303 is OFF (non-conductive state), one communication line of the communication unit 206 is not connected to the power receiving antenna 201 via the FETs 801a and 801b. When the switch unit 303 is OFF (non-conductive state), the other communication line of the communication unit 206 is not connected to the power receiving antenna 201 via the FETs 801c and 801d. Consequently, when the switch unit 303 is OFF (non-conductive state), the communication unit 206 and the power receiving antenna 201 are not connected to each other.

In a case where the voltage level of the control signal from the control unit 204 exceeds the sum of the threshold of all the gates of the FETs 801a, 801b, 801c, and 801d and the signal level of each communication line, the power receiving antenna 201 and the communication unit 206 are connected to each other. When the switch unit 303 is ON (conductive state), one communication line of the communication unit 206 is connected to the power receiving antenna 201 via the FETs 801a and 801b. When the switch unit 303 is ON (conductive state), the other communication line of the communication unit 206 is connected to the power receiving antenna 201 via the FETs 801c and 801d. Consequently, when the switch unit 303 is ON (conductive state), the communication unit 206 and the power receiving antenna 201 are connected to each other.

In a case where the electronic apparatus 200 includes the switch unit 303 shown in FIG. 8, it is necessary to supply the sum of the threshold of the gates and the signal level of each communication line to the gates of the FETs of the switch unit 303, and thus a circuit for driving the switch units 302 and 303 is complicated. However, the control unit 204 can also control the switch unit 303 shown in FIG. 8.

By controlling the switch units 302 and 303, the electronic apparatus 200 in the first embodiment can improve the power supply efficiency while the communication sensitivity, when communication is high and no excess power is supplied to the communication unit 206 at the time of power supply. Therefore, even if communication with the power supply apparatus 100 and power reception from the power supply apparatus 100 are selectively performed in the electronic apparatus 200, it is possible to appropriately perform communication by the communication unit 206 and power reception by the power receiving unit 202.

Note that in the electronic apparatus 200 in the first embodiment, the communication unit 206 and the power control unit 203 are configured as shown in FIG. 3. The first embodiment, however, is not limited to this. The communication unit 206 may be connected to the switch unit 302 and the power control unit 203 may be connected to the switch unit 303. In this case, the switch unit 302 is arranged between the communication unit 206 and the resonant elements 301a and 301b. In this case, the switch unit 303 is arranged between the power control unit 203 and the power receiving antenna 201.

(Second Embodiment)

According to the first embodiment, the capacitance value of the resonance circuit formed by the resonant elements 301a and 301b when the electronic apparatus 200 is in the power supply mode (during the power supply period) is equal to that when the electronic apparatus 200 is in the communication mode (during the communication period). To the contrary, according to the second embodiment, a case in which the capacitance value of a resonance circuit when an electronic apparatus 200 is in the power supply mode (during the power supply period) is different from that when the electronic apparatus 200 is in the communication mode (during the communication period) will be described below. In a case where the input impedance of a power control unit 203 and that of the communication unit 206 are different from each other, the capacitance value of the resonance circuit when the electronic apparatus 200 is in the power supply mode is different from that when the electronic apparatus 200 is in the communication mode.

In the second embodiment, a description of components and operations common to the first embodiment will be omitted, and components and operations different from those in the first embodiment will be described. In the second embodiment, an arrangement of the power receiving unit 202 is different from that in the first embodiment, and the power receiving unit 202 in the second embodiment will be described with reference to FIGS. 9A, 9B, 10A, 10B, 11A, and 11B. In the second embodiment, an arrangement of the power control unit 203 is different from that in the first embodiment, and the power control unit 203 in the second embodiment will be described with reference to FIG. 12. The arrangements of the switch units 302 and 303 are the same as those described in the first embodiment and a description thereof will be omitted.

(Arrangement of Power Receiving Unit 202)

Figure 9A:
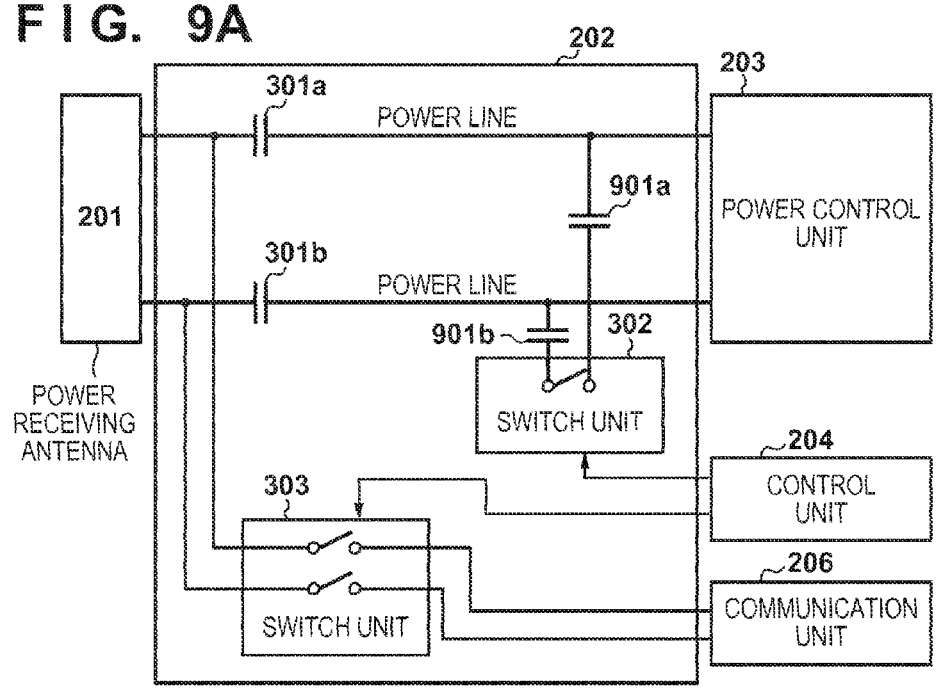
FIGS. 9A and 9B are diagrams for illustrating examples of an arrangement of the power receiving unit 202 in the second embodiment.
Figure 9B:
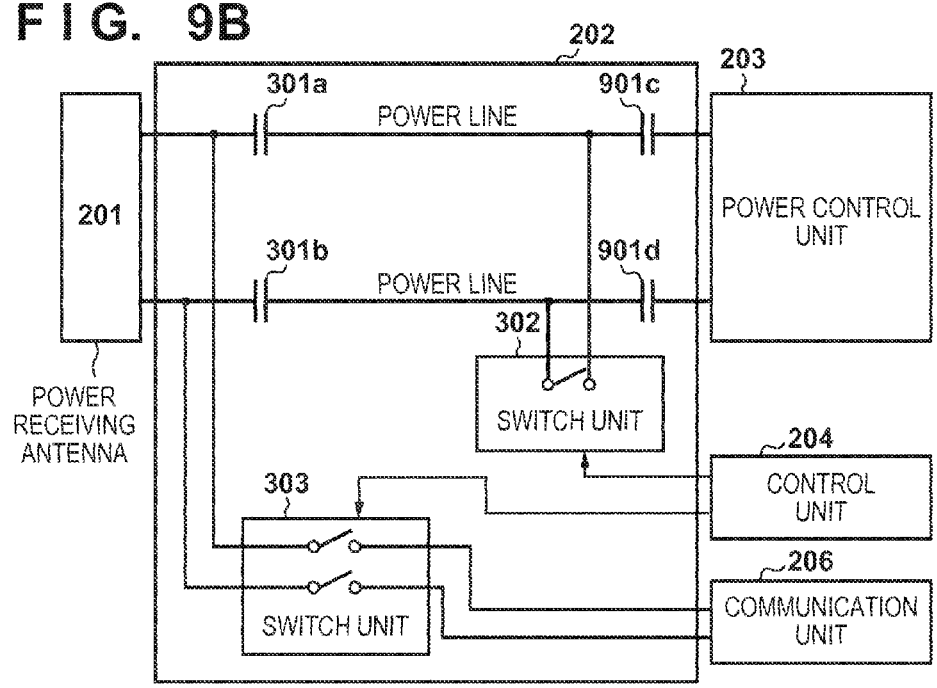

FIGS. 9A and 9B are diagrams showing examples of an arrangement of the power receiving unit 202 in the second embodiment. FIG. 9A shows an arrangement of the power receiving unit 202, in a case where the necessary capacitance value of the resonance circuit when the electronic apparatus 200 is in the communication mode is smaller than the capacitance value of the resonance circuit when the electronic apparatus 200 is in the power supply mode. FIG. 9B shows an arrangement of the power receiving unit 202, in a case where the necessary capacitance value of the resonance circuit when the electronic apparatus 200 is in the power supply mode is smaller than the capacitance value of the resonance circuit when the electronic apparatus 200 is in the communication mode.

Referring to FIGS. 9A and 9B, compensating resonant elements are further included in addition to resonant elements 301a and 301b. The arrangement positions of the compensating resonant elements are different between FIGS. 9A and 9B. A compensating resonant element 901a is a capacitor having a capacitance value smaller than that of the resonant element 301a and smaller than that of the resonant element 301b. A compensating resonant element 901b is a capacitor having a capacitance value smaller than that of the resonant element 301a and smaller than that of the resonant element 301b.

Figure 10A:
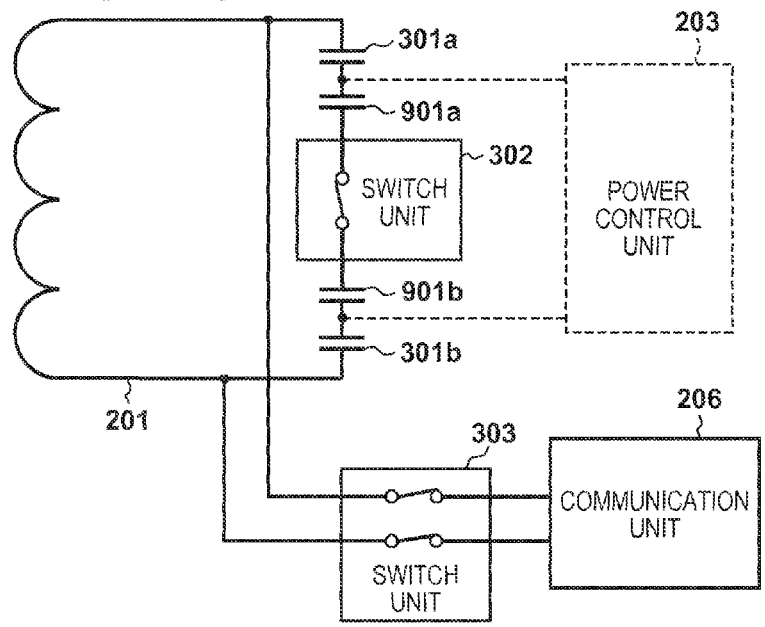
FIGS. 10A and 10B are diagrams for illustrating examples of a relationship between the power receiving antenna 201, the power control unit 203, and the communication unit 206 in the second embodiment.
Figure 10B:
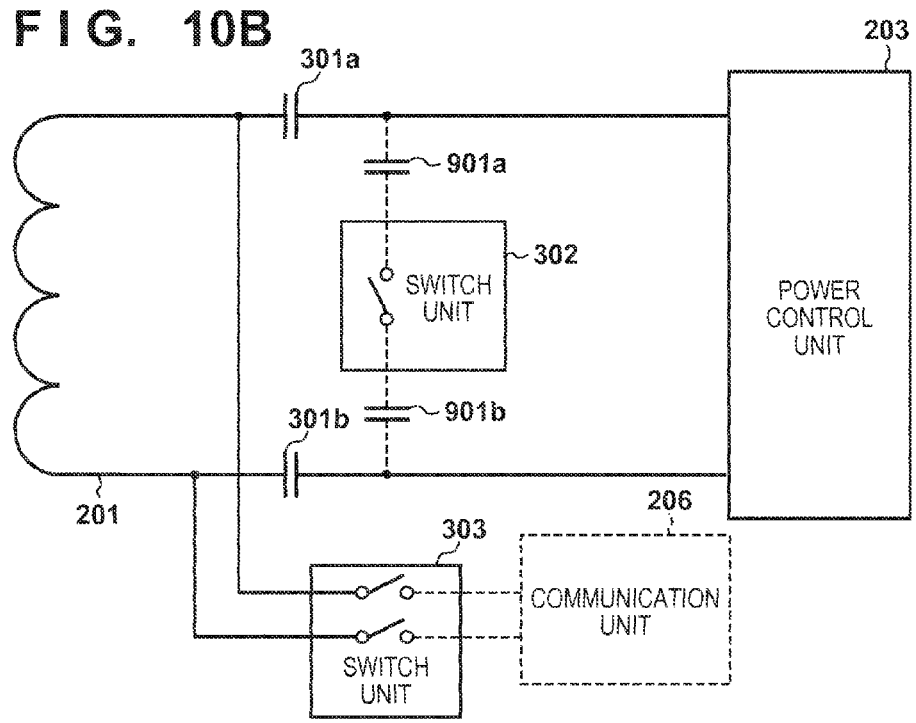
Figure 11A:
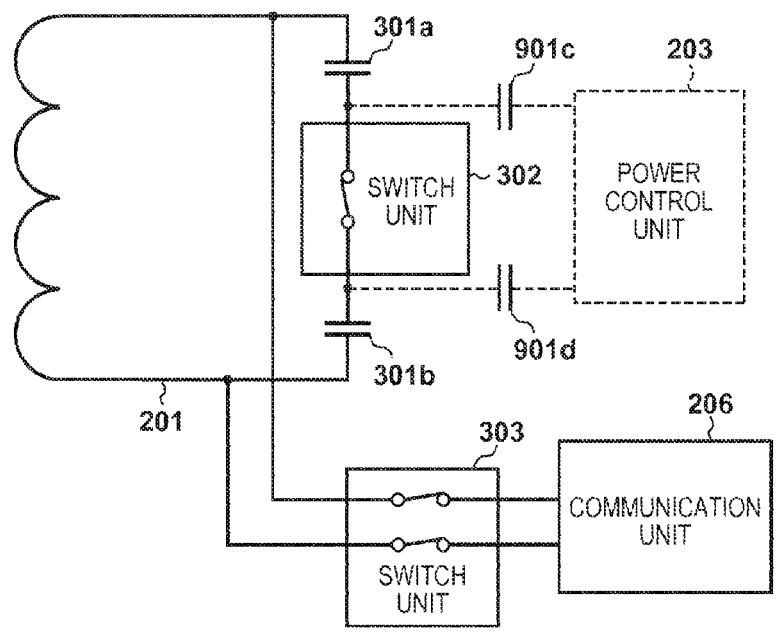
FIGS. 11A and 11B are diagrams for illustrating other examples of a relationship between the power receiving antenna 201, the power control unit 203, and the communication unit 206 in the second embodiment.
Figure 11B:
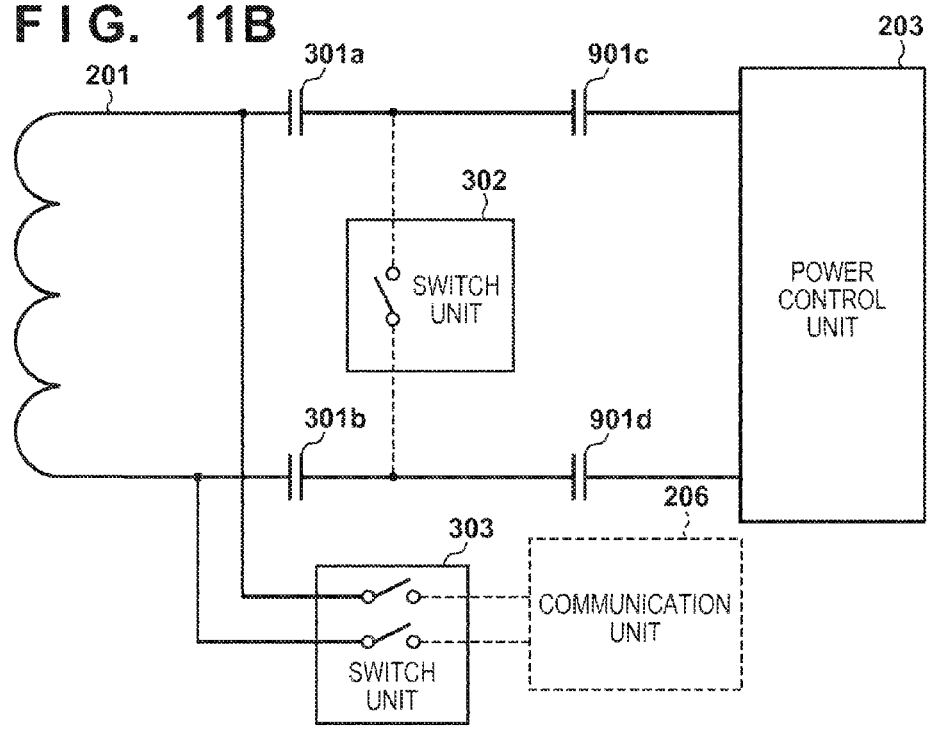

FIGS. 10A and 10B are diagrams for illustrating examples of a relationship between the power receiving antenna 201, the power control unit 203, and the communication unit 206, in a case where the electronic apparatus 200 includes the power receiving unit 202 shown in FIG. 9A. FIGS. 11A and 11B are diagrams for illustrating other examples of a relationship between the power receiving antenna 201, the power control unit 203, and the communication unit 206, in a case where the electronic apparatus 200 includes the power receiving unit 202 shown in FIG. 9B.

The power receiving unit 202 shown in FIG. 9A includes the resonant elements 301a and 301b, the switch units 302 and 303, and the compensating resonant elements 901a and 901b.

One terminal of the compensating resonant element 901a is connected to one power line of the power control unit 203, and the other terminal of the compensating resonant element 901a is connected to the switch unit 302. One terminal of the compensating resonant element 901b is connected to the other power line of the power control unit 203, and the other terminal of the compensating resonant element 901b is connected to the switch unit 302. When a control unit 204 turns on the switch units 302 and 303 (conductive state), the resonant element 301a and the compensating resonant element 901a are connected in series, and the resonant element 301b and the compensating resonant element 901b are connected in series. Furthermore, in this case, the compensating resonant elements 901a and 901b are connected in series.

FIG. 10A is a diagram for illustrating an example of a relationship between the power receiving antenna 201, the power control unit 203, and the communication unit 206, when the control unit 204 turns on (conductive state) the switch units 302 and 303 (when the electronic apparatus 200 is in the communication mode). When the control unit 204 turns on the switch units 302 and 303 (conductive state), the resonant elements 301a and 301b and the compensating resonant elements 901a and 901b are connected in series, as shown in FIG. 10A. When the control unit 204 turns on the switch units 302 and 303 (conductive state), the resonant elements 301a and 301b and the compensating resonant elements 901a and 901b are connected to the power receiving antenna 201 in parallel, as shown in FIG. 10A.

The capacitance value of the resonance circuit when the switch units 302 and 303 are ON (conductive state) is determined based on the capacitance values of the resonant elements 301a and 301b and compensating resonant elements 901a and 901b. The capacitance value of the resonance circuit when the switch units 302 and 303 are ON (conductive state) becomes smaller by an amount obtained in a case where the compensating resonant elements 901a and 901b are connected to the resonant elements 301a and 301b in series.

FIG. 10B is a diagram for illustrating an example of a relationship between the power receiving antenna 201, the power control unit 203, and the communication unit 206, when the control unit 204 turns off (non-conductive state) the switch units 302 and 303 (when the electronic apparatus 200 is in the power supply mode). When the control unit 204 turns off the switch units 302 and 303 (non-conductive state), the resonant elements 301a and 301b and the compensating resonant elements 901a and 901b are not connected in series, as shown in FIG. 10B. When the control unit 204 turns off the switch units 302 and 303 (non-conductive state), the resonant elements 301a and 301b are connected to the power receiving antenna 201 in series, as shown in FIG. 10B. However, the compensating resonant elements 901a and 901b are not connected to the power receiving antenna 201.

When the switch units 302 and 303 are OFF (non-conductive state), the capacitance value of the resonance circuit is determined based on the capacitance values of the resonant elements 301a and 301b.

The capacitance value of the resonance circuit when the switch units 302 and 303 are OFF (non-conductive state) (FIG. 10B) is larger than that when the switch units 302 and 303 are ON (conductive state) (FIG. 10A).

The power receiving unit 202 shown in FIG. 9B includes the resonant elements 301a and 301b, the switch units 302 and 303, and compensating resonant elements 901c and 901d. The compensating resonant element 901c is a capacitor having a capacitance value smaller than that of the resonant element 301a and smaller than that of the resonant element 301b. The compensating resonant element 901d is a capacitor having a capacitance value smaller than that of the resonant element 301a and smaller than that of the resonant element 301b.

One terminal of the compensating resonant element 901c is connected to one power line of the power control unit 203, and the other terminal of the compensating resonant element 901c is connected to the resonant element 301a. One terminal of the compensating resonant element 901d is connected to one power line of the power control unit 203, and the other terminal of the compensating resonant element 901d is connected to the resonant element 301b. When the control unit 204 turns on the switch units 302 and 303 (conductive state), the resonant element 301a and the compensating resonant element 901c are connected in series, and the resonant element 301b and the compensating resonant element 901d are connected in series. Furthermore, in this case, the compensating resonant elements 901c and 901d are connected in series. When the control unit 204 turns on the switch units 302 and 303 (conductive state), the resonant elements 301a and 301b are connected in series. Furthermore, in this case, the contact between the resonant element 301a and the compensating resonant element 901c and the contact between the resonant element 301b and the compensating resonant element 901d are short-circuited.

FIG. 11A is a diagram for illustrating an example of a relationship between the power receiving antenna 201, the power control unit 203, and the communication unit 206, when the control unit 204 turns on the switch units 302 and 303 (conductive state) (when the electronic apparatus 200 is in the communication mode). When the control unit 204 turns on the switch units 302 and 303 (non-conductive state), the resonant elements 301a and 301b are connected in series, as shown in FIG. 11A. When the control unit 204 turns on the switch units 302 and 303 (conductive state), the compensating resonant elements 901c and 901d are not connected to the power receiving antenna 201. The capacitance value of the resonance circuit when the switch units 302 and 303 are ON (conductive state) is determined based on the capacitance values of the resonant elements 301a and 301b.

FIG. 11B is a diagram for illustrating an example of a relationship between the power receiving antenna 201, the power control unit 203, and the communication unit 206, when the control unit 204 turns off the switch units 302 and 303 (non-conductive state) (when the electronic apparatus 200 is in the power supply mode). When the control unit 204 turns off the switch units 302 and 303 (non-conductive state), the resonant elements 301a and 301b are connected to the compensating resonant elements 901c and 901d in series, as shown in FIG. 11B. When the control unit 204 turns off the switch units 302 and 303 (non-conductive state), the resonant elements 301a and 301b and the compensating resonant elements 901c and 901d are connected to the power receiving antenna 201 in series, as shown in FIG. 11B.

When the switch units 302 and 303 are OFF (non-conductive state), the capacitance value of the resonance circuit is determined based on the capacitance values of the resonant elements 301a and 301b and compensating resonant elements 901c and 901d. The capacitance value of the resonance circuit when the switch units 302 and 303 are OFF (non-conductive state) becomes smaller by an amount obtained in a case where the compensating resonant elements 901c and 901d are connected to the resonant elements 301a and 301b in series. The capacitance value of the resonance circuit when the switch units 302 and 303 are OFF (non-conductive state) (FIG. 11B) is smaller than that when the switch units 302 and 303 are ON (conductive state) (FIG. 11A).

As described above, in a case where the power receiving unit 202 has the arrangement shown in FIG. 9A or 9B, the capacitance value of the resonance circuit can be changed depending on whether the electronic apparatus 200 is in the communication mode or the power supply mode. Whether the power receiving unit 202 has the arrangement shown in FIG. 9A or 9B is determined by measuring the input impedance of the power control unit 203 and that of the communication unit 206.

(Arrangement of Power Control Unit 203)

Figure 12:
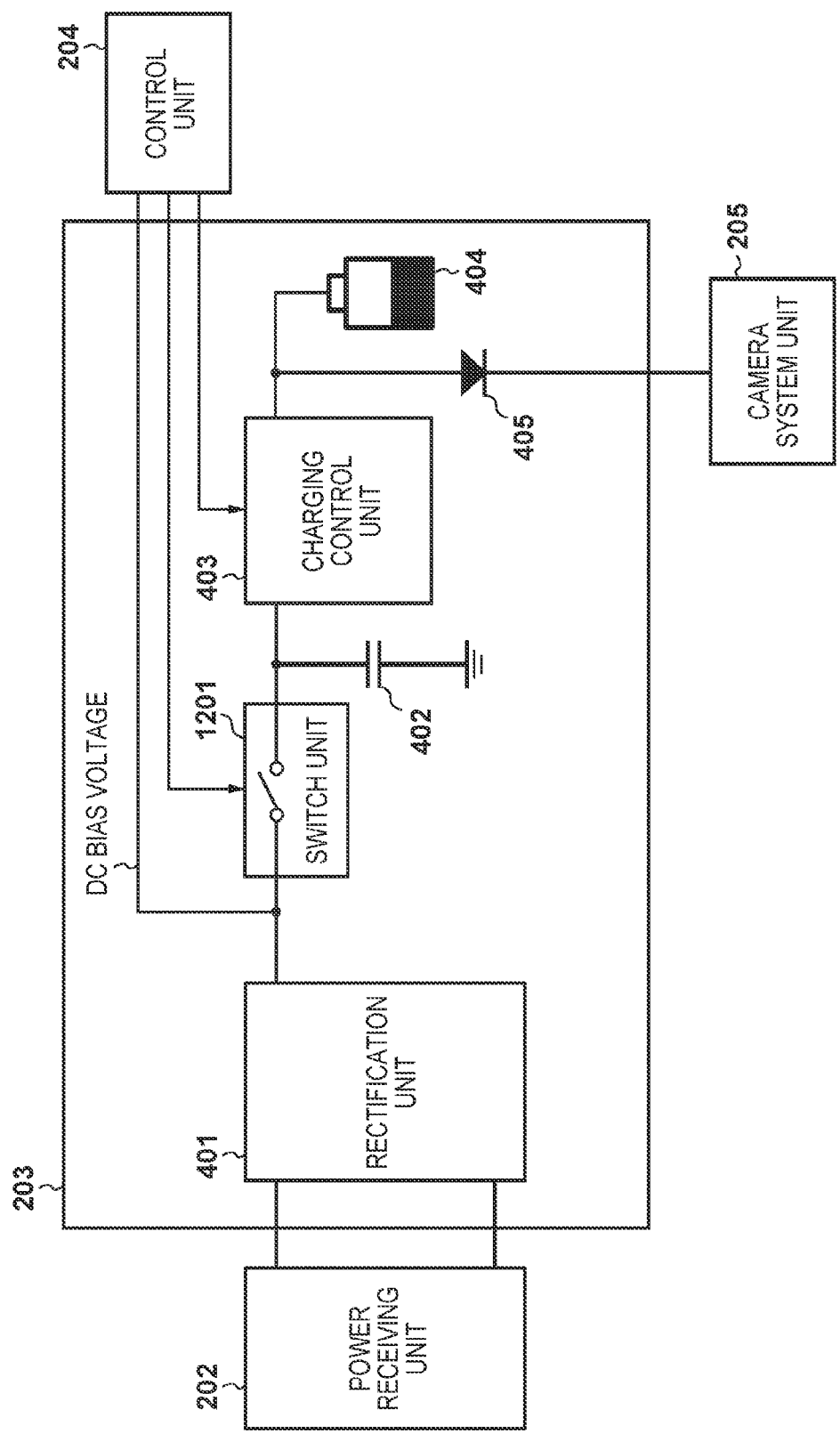
FIG. 12 is a diagram for illustrating an example of an arrangement of the power control unit 203 in the second embodiment.

The power control unit 203 will be described with reference to FIG. 12. FIG. 12 is a diagram showing an example of an arrangement of the power control unit 203.

Similarly to the power control unit 203 in the first embodiment, the power control unit 203 includes a rectification unit 401, a smoothing capacitor 402, a charging control unit 403, a secondary battery 404, and a diode 405. The power control unit 203 shown in FIG. 12 further includes a DC switch 1201. As shown in FIG. 12, the DC switch 1201 is arranged between the rectification unit 401 and the smoothing capacitor 402. Furthermore, the control unit 204 applies a DC bias between the rectification unit 401 and the smoothing capacitor 402.

In accordance with a timing at which the electronic apparatus 200 is in the communication mode, the control unit 204 applies a DC bias by outputting a control signal between the rectification unit 401 and the smoothing capacitor 402. In accordance with a timing at which the electronic apparatus 200 is in the power supply mode, the control unit 204 may apply a DC bias by outputting a control signal between the rectification unit 401 and the smoothing capacitor 402. The DC bias may be applied, as a voltage higher than that of the control signal, between the rectification unit 401 and the smoothing capacitor 402 via a voltage conversion element, instead of directly applying the DC bias from the control unit 204. Furthermore, the DC bias may be applied between the rectification unit 401 and the smoothing capacitor 402 via a resistance (for example, 1 KΩ) from the control unit 204. The voltage value of the DC bias applied by the control unit 204 is a voltage value larger than the peak value of an AC voltage before input to the rectification unit 401. The control unit 204 applies the DC bias as a reverse bias to the diode of the rectification unit 401. When the electronic apparatus 200 is in the communication mode, the control unit 204 increases the input impedance of the power control unit 203 by applying a reverse DC bias to the rectification unit 401, thereby causing the switch unit 302 to operate when the electronic apparatus 200 is in the communication mode.

The DC switch 1201 is, for example, a P-channel FET. The DC switch 1201 is connected to the control unit 204, and the control unit 204 turns on (being conductive state) or off (being non-conductive state) the DC switch 1201. The DC switch 1201 controls not to supply the power rectified by the rectification unit 401 to the smoothing capacitor 402 or the charging control unit 403 serving as a DC load. Thus, when the electronic apparatus 200 is in the communication mode, the control unit 204 turns off the DC switch 1201 (non-conductive state) to disconnect a load such as the charging control unit 403 from the rectification unit 401. As a result, the DC bias voltage from the control unit 204 is securely applied to the rectification unit 401. When the electronic apparatus 200 is in the power supply mode, the control unit 204 turns on the DC switch 1201 (conductive state) to supply the power from the rectification unit 401 to a load such as the charging control unit 403.

As shown in FIG. 12, the input impedance of the power control unit 203 is increased by applying the DC bias from the control unit 204. This allows the control unit 204 to readily control to turn on the switch unit 302 (conductive state) when the electronic apparatus 200 is in the communication mode.

As in the first embodiment, in a case where the capacitance value of the resonance circuit when the electronic apparatus 200 is in the communication mode coincides with that when the electronic apparatus 200 is in the power supply mode, if the switch unit 302 is turned on (conductive state), the switch unit 302 short-circuits the input terminals of the power control unit 203. In this case, the electronic apparatus 200 preferably uses the power control unit 203 having the arrangement shown in FIG. 4 rather than the power control unit 203 having the arrangement shown in FIG. 12.

As in the second embodiment, in a case where the capacitance value of the resonance circuit when the electronic apparatus 200 is in the communication mode is different from that when the electronic apparatus 200 is in the power supply mode, the electronic apparatus 200 preferably uses the power control unit 203 having the arrangement shown in FIG. 12. In a case where the power receiving unit 202 has the arrangement shown in FIG. 9A, the capacitance value of the resonance circuit when the electronic apparatus 200 is in the communication mode is different from that when the electronic apparatus 200 is in the power supply mode. In a case where the power receiving unit 202 has the arrangement shown in FIG. 9A, even if the switch unit 302 is turned on (conductive state) when the electronic apparatus 200 is in the communication mode, the compensating resonant elements 901a and 901b are respectively connected to the input terminals of the power control unit 203. In this case, the impedance on the side of the switch unit 302 is not zero. Therefore, the electronic apparatus 200 needs to make the input impedance of the power control unit 203 higher than the impedances of the switch unit 302 and compensating resonant elements 901a and 901b. Thus, as in the second embodiment, in a case where the capacitance value of the resonance circuit when the electronic apparatus 200 is in the communication mode is different from that when the electronic apparatus 200 is in the power supply mode, the electronic apparatus 200 preferably uses the power control unit 203 having the arrangement shown in FIG. 12.

As described above, even if the capacitance value of the resonance circuit when the electronic apparatus 200 is in the communication mode is different from that when the electronic apparatus 200 is in the power supply mode, it is possible to prevent an excess voltage from being supplied to the communication unit 206 when the electronic apparatus 200 is in the power supply. Furthermore, the electronic apparatus 200 can improve the power supply efficiency when the electronic apparatus 200 is in the power supply mode, and improve the communication sensitivity of the communication unit 206 when the electronic apparatus 200 is in the communication mode. Even if communication with the power supply apparatus 100 and power reception from the power supply apparatus 100 are selectively performed in the electronic apparatus 200, it is possible to appropriately perform communication by the communication unit 206 and power reception by the power receiving unit 202.

Note that the first and second embodiments assume that the resonance frequency f is 13.56 MHz. However, the resonance frequency f may be a commercial frequency of 50/60 Hz, a frequency of 6.78 MHz, or a frequency of 100 kHz to 250 kHz.

(Third Embodiment)

At least one of the various functions, processes, and methods described in the first and second embodiments can be achieved using a program. Hereinafter, in a third embodiment, a program for realizing at least one of the various functions, processes, and methods described in the first and second embodiments will be referred to as a "program X". Furthermore, in the third embodiment, a computer for executing the program X will be referred to as a "computer Y". Examples of the computer Y include a personal computer, a microcomputer, and a central processing unit (CPU).

At least one of the various functions, processes, and methods described in the first and second embodiments can be realized by the computer Y executing the program X. In this case, the program X is supplied to the computer Y via a computer readable storage medium. A computer readable storage medium in the third embodiment includes at least one of a hard disk device, a magnetic storage device, an optical storage device, a magneto-optical storage device, a memory card, a read only memory (ROM), and a random access memory (RAM). Furthermore, the computer readable storage medium in the third embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2014-193069, filed Sep. 22, 2014, which is hereby incorporated by reference herein in its entirety.

What is claimed is:

1. An electronic apparatus comprising:
    an antenna that wirelessly receives power;
    a power circuit that inputs power received by the antenna;
    a communication circuit that performs communication using the antenna;
    switches; and
    a resonant element that resonates with the antenna,
    wherein the resonant element is arranged between the antenna and one of the power circuit and the communication circuit, and
    wherein at least one of the switches is arranged between the resonant element and the one circuit, and at least another one of the switches is arranged between the other circuit and the antenna.

2. The electronic apparatus according to claim 1, wherein one of terminals of each of the switches is connected to GND.

3. The electronic apparatus according to claim 1, wherein the switches operate to input power received by the antenna to the power circuit at the time of power supply, and to input power received by the antenna to the communication circuit at the time of communication, and
    wherein an input terminal of the power circuit is short-circuited by the operations of the switches at the time of communication.

4. The electronic apparatus according to claim 1, wherein the switches operate to input power received by the antenna to the power circuit at the time of power supply, and to input power received by the antenna to the communication circuit at the time of communication, and
    wherein a voltage input to the communication circuit is made lower than a voltage input to the power circuit by the operations of the switches at the time of power supply.

5. The electronic apparatus according to claim 1, wherein each of the switches that inputs power to each of the power circuit and the communication circuit is formed by at least two switches in a case where a circuit connected to the antenna is balanced.

6. The electronic apparatus according to claim 1, wherein each of the switches that inputs power to each of the power circuit and the communication circuit is formed by at least one switch in a case where a circuit connected to the antenna is unbalanced.

7. The electronic apparatus according to claim 1, wherein among the switches, a switch that inputs power to the power circuit is formed using at least two FETs.

8. The electronic apparatus according to claim 1, further comprising:
    a compensating resonant element that resonates with the resonant element and the antenna,
    wherein the compensating resonant element is arranged between the resonant element and the at least one of the switches arranged between the resonant element and the one circuit.

9. The electronic apparatus according to claim 1, further comprising:
    a compensating resonant element that resonates with the resonant element and the antenna,
    wherein the compensating resonant element is arranged between the resonant element and the one circuit.

10. An electronic apparatus comprising:
    an antenna that wirelessly receives power;
    a power circuit that inputs power received by the antenna;
    a communication circuit that performs communication using the antenna;
    a switch that switches between a conductive state and a non-conductive state; and
    a resonance circuit that resonates with the antenna,
    wherein the switch switches to input power received by the antenna to the power circuit at the time of power supply, and to input power received by the antenna to the communication circuit at the time of communication, and
    wherein an arrangement of the resonance circuit is changed by switching the switch.

11. The electronic apparatus according to claim 10, wherein the resonance circuit serves as a parallel resonance circuit by switching the switch at the time of communication.

12. The electronic apparatus according to claim 10, wherein the resonance circuit serves as a series resonance circuit by switching the switch at the time of power supply.

13. An electronic apparatus comprising:
    an antenna that wirelessly receives power;
    a power circuit that inputs power received by the antenna;
    a communication circuit that performs communication using the antenna; and
    switches,
    wherein the switches operate to input power received by the antenna to the power circuit at the time of power supply, and to input power received by the antenna to the communication circuit at the time of communication, and
    wherein one of terminals of each of the switches is connected to GND.

14. The electronic apparatus according to claim 13, wherein among the switches, a switch arranged between the communication circuit and the antenna includes an attenuation element arranged between the communication circuit and the antenna.

15. The electronic apparatus according to claim 14, wherein the attenuation element includes a capacitor.

16. The electronic apparatus according to claim 13, wherein in a case where one of the switches arranged between the communication circuit and the antenna is conducted to the GND, an impedance between an input of the communication circuit and the GND becomes not less than a predetermined value.

17. The electronic apparatus according to claim 16, wherein the communication circuit has at least an active state in which the communication circuit operates and an inactive state in which the communication circuit cannot perform a communication operation, and
    wherein the predetermined value is an impedance value for generating a voltage level at which the communication circuit is kept in the active state.

* * * * *